(12) United States Patent
Barker

(10) Patent No.: US 8,370,222 B2
(45) Date of Patent: Feb. 5, 2013

(54) SYSTEMS AND METHODS FOR TRACKING LUMBER IN A SAWMILL

(75) Inventor: Earl Barker, Enumclaw, WA (US)

(73) Assignee: EB Associates, Inc., Enumclaw, WA (US)

( * ) Notice: Subject to any disclaimer, the term of this patent is extended or adjusted under 35 U.S.C. 154(b) by 0 days.

(21) Appl. No.: 13/529,549

(22) Filed: Jun. 21, 2012

(65) Prior Publication Data

US 2012/0262725 A1    Oct. 18, 2012

Related U.S. Application Data

(60) Division of application No. 12/424,402, filed on Apr. 15, 2009, now Pat. No. 8,229,803, which is a continuation-in-part of application No. 11/873,090, filed on Oct. 16, 2007.

(51) Int. Cl.
*G06Q 10/00* (2012.01)
*B27M 1/00* (2006.01)

(52) U.S. Cl. ......... 705/28; 705/23; 144/329; 144/117.3; 144/193.1

(58) Field of Classification Search ................... 209/517; 83/73; 700/167; 144/335, 41, 329, 117.3, 144/193.1; 705/28, 33
See application file for complete search history.

(56) References Cited

U.S. PATENT DOCUMENTS

| | | | |
|---|---|---|---|
| 3,890,509 A * | 6/1975 | Maxey | 250/559.25 |
| 3,931,589 A | 1/1976 | Aisenberg et al. | |
| 4,139,035 A | 2/1979 | Bystedt et al. | |
| 4,188,544 A * | 2/1980 | Chasson | 250/559.06 |
| 4,221,974 A * | 9/1980 | Mueller et al. | 250/559.48 |
| 4,437,367 A | 3/1984 | Hauser | |
| 4,524,812 A | 6/1985 | Murphy | |
| 4,541,722 A * | 9/1985 | Jenks | 356/606 |
| 4,691,601 A | 9/1987 | Peddinghaus | |
| 4,691,751 A * | 9/1987 | Komulainen | 144/357 |
| 4,916,629 A * | 4/1990 | Bogue et al. | 702/40 |
| 4,926,917 A | 5/1990 | Kirbach | |
| 5,056,922 A * | 10/1991 | Cielo et al. | 356/604 |
| 5,892,808 A * | 4/1999 | Goulding et al. | 378/63 |
| 5,897,800 A | 4/1999 | Sawai et al. | |
| 5,946,995 A * | 9/1999 | Michell et al. | 83/425.3 |
| 5,949,086 A | 9/1999 | Reponen et al. | |
| 6,041,683 A | 3/2000 | Timperi et al. | |
| 6,062,280 A * | 5/2000 | Newnes et al. | 144/357 |
| 6,064,035 A | 5/2000 | Toller et al. | |
| 6,094,269 A | 7/2000 | Ben-Dove et al. | |
| 6,127,649 A | 10/2000 | Toller et al. | |
| 6,333,795 B1 * | 12/2001 | Kaji | 358/474 |
| 6,382,062 B1 | 5/2002 | Smith | |
| 6,425,346 B1 | 7/2002 | Birk | |
| 6,437,357 B1 | 8/2002 | Weiss et al. | |
| 6,449,585 B1 | 9/2002 | Hyun et al. | |
| 6,463,402 B1 * | 10/2002 | Bennett et al. | 703/2 |
| 6,466,305 B1 | 10/2002 | McBain | |
| 6,598,477 B2 * | 7/2003 | Floyd | 73/597 |

(Continued)

OTHER PUBLICATIONS

"Automatic On-Line Control Solution for Multiple Parallel Sawn Pieces in Log Breakdown and Resaw," Inx Systems SeeCon SC2000 Real-Time Lumber Size Control System, Inx-Systems, Inc., Cumming, Georgia, 2 pages.

(Continued)

*Primary Examiner* — Ramsey Refai
(74) *Attorney, Agent, or Firm* — Seed IP Law Group PLLC

(57) ABSTRACT

At least one geometric characteristic for each of a number of pieces of lumber is determined. Each of the pieces of lumber may then be logically associated with at least one of a log or a cant from which the piece of lumber was sawn.

3 Claims, 16 Drawing Sheets

U.S. PATENT DOCUMENTS

| | | | |
|---|---|---|---|
| 6,618,155 B2 * | 9/2003 | Metcalfe et al. | 356/625 |
| 6,681,672 B2 | 1/2004 | Myrfield | |
| 6,757,058 B1 * | 6/2004 | Carman et al. | 356/237.2 |
| 6,773,552 B1 * | 8/2004 | Albert et al. | 162/263 |
| 6,988,439 B2 | 1/2006 | Liu et al. | |
| 7,134,465 B2 * | 11/2006 | Herring et al. | 144/394 |
| 7,200,458 B2 * | 4/2007 | Carman et al. | 700/117 |
| 7,227,165 B2 * | 6/2007 | Hubert et al. | 250/559.25 |
| 7,308,921 B1 | 12/2007 | Brewer, Sr. | |
| 7,406,190 B2 * | 7/2008 | Carman et al. | 382/141 |
| 7,426,422 B2 * | 9/2008 | Carman et al. | 700/117 |
| 7,660,433 B2 * | 2/2010 | Dralle et al. | 382/103 |
| 7,660,443 B2 | 2/2010 | Azuma et al. | |
| 2001/0034561 A1 | 10/2001 | Myrfield | |
| 2005/0013472 A1 * | 1/2005 | Gauthier | 382/141 |
| 2006/0053990 A1 | 3/2006 | Barker | |
| 2008/0029511 A1 | 2/2008 | Barker et al. | |
| 2009/0095377 A1 | 4/2009 | Barker | |
| 2009/0095378 A1 | 4/2009 | Barker | |

OTHER PUBLICATIONS

"Inx SeeCon SC2000 & SC2000L: True Real-Time Lumber Size Control System—Technical Considerations for Successful Installation," Inx Systems Technical Information, Inx-Systems, Inc., Cumming, Georgia, 2002, 8 pages.

"Inx SeeCon SC2000 On-Line Lumber Size Control System: Payback Time & Return-on-Investment," Inx-Systems, Inc., Cumming, Georgia, Dec. 12, 2001, 8 pages.

"Modern Mill-Wide Lumber Size Control: Methods and Components of a Complete Lumber Size Control System," Inx Systems Educational Information, Inx-Systems, Inc., Cumming, Georgia, 2002, 7 pages.

"Sawmill Operator's Guide to Greater Profits: Everything Profit-Conscious Management Needs to Know about New True Real-Time Lumber Size Control," Inx Systems Managerial Information, Inx-Systems, Inc., Cumming, Georgia, 2002, 13 pages.

"SeeCon True Real-Time Lumber Size Control System—Frequently Asked Questions," 2002, 7 pages.

Vuorilehto, "Benefits of Continuous Dimension Control in Sawmills," Inx-Systems, Inc., Cumming, Georgia, 9 pages.

Vuorilehto, "Manual Lumber Measurement Too Slow for Today's Sawmills: Computerized Measures of Lumber After Blade or Setup Changes Gather Far More Accurate Data than Manual Methods; Fixing Errors is Faster," Inx-Systems, Inc., Cumming, Georgia, 8 pages.

Vuorilehto, "New Inx Saw Blade Manager Software Optimizes Production Volume and Quality; Minimizes Downtime and Blade Costs," Inx-Systems, Inc., Cumming, Georgia, 4 pages.

Vuorilehto, "Size Control of Lumber by Optical Means," Inx-Systems, Inc., Cumming, Georgia, 6 pages.

Barker, "Sawmill Log Speed Adjustment System Using Saw Deflection Information," Office Action mailed Mar. 15, 2007 for U.S. Appl. No. 10/942,575, 5 pages.

Barker, "Sawmill Log Speed Adjustment System Using Saw Deflection Information," Amendment filed Sep. 4, 2007 for U.S. Appl. No. 10/942,575, 6 pages.

Barker, "Sawmill Log Speed Adjustment System Using Saw Deflection Information," Office Action mailed Nov. 2, 2007 for U.S. Appl. No. 10/942,575, 13 pages.

Barker, "Sawmill Log Speed Adjustment System Using Saw Deflection Information," Amendment filed May 2, 2008 for U.S. Appl. No. 10/942,575, 6 pages.

Barker, "Sawmill Log Speed Adjustment System Using Saw Deflection Information," Office Action mailed Jun. 23, 2008 for U.S. Appl. No. 10/942,575, 12 pages.

Barker, "Systems and Methods for Monitoring a Saw Blade During Sawing," Office Action mailed Jan. 27, 2010 for U.S. Appl. No. 11/873,101, 10 pages.

Barker, "Systems and Methods for Monitoring a Saw Blade During Sawing," Amendment filed Apr. 22, 2010 for U.S. Appl. No. 11/873,101, 20 pages.

Barker, "Systems and Methods for Monitoring a Saw Blade During Sawing," Office Action mailed May 10, 2010 for U.S. Appl. No. 11/873,101, 10 pages.

Barker, "Systems and Methods for Monitoring a Saw Blade During Sawing," Amendment filed Jul. 23, 2010 for U.S. Appl. No. 11/873,101, 13 pages.

Barker, "Systems and Methods for Monitoring a Saw Blade During Sawing," Office Action mailed Jun. 8, 2010 for U.S. Appl. No. 11/873,097, 11 pages.

Barker, "Systems and Methods for Monitoring a Saw Blade During Sawing," Amendment filed Aug. 5, 2010 for U.S. Appl. No. 11/873,097, 26 pages.

"SeeCon: MillWide Lumber Size Control" USNR Brochure, 2004, 2 pages.

"Size Does Matter"—Perceptron—USNR News, May 2003:1-3.

Barker, "Systems and Methods for Tracking Lumber in a Sawmill," Office Action mailed Aug. 4, 2010 for U.S. Appl. No. 11/873,090, 9 pages.

Barker, "Systems and Methods for Tracking Lumber in a Sawmill," Amendment filed Jan. 4, 2011 for U.S. Appl. No. 11/873,090, 12 pages.

Barker, "Systems and Methods for Tracking Lumber in a Sawmill," Office Action mailed Mar. 23, 2011 for U.S. Appl. No. 11/873,090, 8 pages.

Barker, "Systems and Methods for Tracking Lumber in a Sawmill," Amendment filed May 23, 2011 for U.S. Appl. No. 11/873,090, 12 pages.

Barker, "Systems and Methods for Tracking Lumber in a Sawmill," Office Action mailed Nov. 7, 2011 for U.S. Appl. No. 12/424,402, 9 pages.

Barker, "Systems and Methods for Tracking Lumber in a Sawmill," Amendment filed Feb. 3, 2012 for U.S. Appl. No. 12/424,402, 15 pages.

* cited by examiner

SYSTEMS AND METHODS FOR TRACKING LUMBER IN A SAWMILL

CROSS-REFERENCE(S) TO RELATED APPLICATION(S)

This application is a division of U.S. patent application Ser. No. 12/424,402, filed Apr. 15, 2009 which is a continuation-in-part of U.S. patent application Ser. No. 11/873,090, filed Oct. 16, 2007, now pending, which application is incorporated herein by reference in its entirety.

BACKGROUND

1. Technical Field

This description generally relates to sawmills, and more particularly to tracking lumber through a sawmill.

2. Description of the Related Art

The sawmill industry has become largely automated. Full length tree trunks are delivered to sawmills, where they are automatically debarked, scanned and cut into log segments based on their scanned geometry. These log segments are then typically processed at a number of automated stations, depending on the sawmill and the type of wood. These processing stations produce lumber from each log segment, often without any human intervention.

One of the first processing stations in many sawmills is the primary breakdown machine, which processes log segments to produce cants and sideboards. The primary breakdown machine typically includes chip heads for removing slabs as well as one or more band saws for removing sideboards from the log segments. Each log segment may be scanned prior to processing at the primary breakdown machine, and a primary breakdown computer optimizer may then determine an optimal mix of lumber that can be obtained from that log segment based on the scanned geometry. The computer optimizer may then rotate the log segment and control the relative position of the chip heads and band saws to achieve that optimal mix of lumber.

Downstream from the primary breakdown machine, cants may be further processed at a gangsaw to produce boards. Gangsaws typically include a number of parallel, circular saw blades located at precise intervals within a sawbox and, at the front of the sawbox, two chip heads (e.g., vertical drum chip heads) for removing excess wood from the outside of each cant. Cants may be transported in a straight line through the gangsaw using feed rolls on the upstream and downstream sides of the sawbox or may be driven through the gangsaw along a curved path during a curve sawing process. Alternatively, the sawbox may be moved during the cut to produce a curved sawing path. In many sawmills, a cant scanner scans the incoming cants prior to processing by the gangsaw. A gangsaw computer optimizer then determines optimal locations for the chip heads and saw blades based on the scanned geometry of each cant.

Boards sawn by the gangsaw, as well as sideboards from the primary breakdown machine, may then be processed by an edger. The edger typically includes one or more saw blades for sawing along the length of the boards to achieve a chosen width. After edging, the boards are transported to a trimmer, where the boards can be trimmed to a final length. Both the edger and the trimmer may also have corresponding scanning systems and computer optimizers to determine how best to saw each piece of lumber.

At each processing station, computer optimizers make determinations regarding the optimal way to saw each piece to achieve the greatest value. Yet, the modern sawmill lacks an effective feedback system to determine if the processing stations are indeed realizing that value. Not only does each individual processing station lack feedback to determine whether or not its scanning, optimization and mechanical systems are functioning properly, but also the sawmill as a whole lacks global feedback on which pieces of lumber were obtained from each processed log.

There is therefore a need for a sawmill auditing system that provides a feedback loop to help find and troubleshoot errors in the sawmill's processes and to independently audit optimization.

BRIEF SUMMARY

Embodiments of sawmill auditing systems that provide such feedback are described below. The sawmill auditing system includes a number of independent scan zones located throughout the sawmill. Each scan zone includes point or planar laser scanners to scan passing pieces of lumber. For example, one of the scan zones may be located near the gangsaw and can scan the boards sawn from each cant at that processing station.

The scan zones are all coupled to an auditing computer that analyzes the image data from the scan zones in order to determine geometric characteristics of the scanned pieces of lumber. Continuing the gangsaw scan zone example, the auditing computer might determine thicknesses, widths and wane dimensions for the boards sawn by the gangsaw as well as grain pattern.

If the auditing computer is in communication with the computer optimizers described above, the auditing computer can then automatically compare the actual geometry of each piece of lumber with the geometry expected by the computer optimizer. Differences might indicate problems in the scanning and/or mechanical systems of a processing station. The auditing computer might also perform its own, post-processing optimization and compare the actual geometry of each piece of lumber with the geometry the auditing computer would have expected based on its optimization algorithm. Differences might be indicative of problems in the scanning, mechanical and/or optimization systems of a processing station. Thus, the auditing computer can provide fast, immediate feedback to each processing station on the processing station's individual performance. This feedback may be used by sawmill personnel to take corrective action (e.g., to resolve a mechanical issue) or may be used to update the algorithms used by the computer optimizers.

Based on a comparison between the geometry of a piece of lumber and previously determined geometry for a log or cant, the auditing computer can also associate pieces of lumber with the particular log or cant from which those pieces of lumber were sawn. This provides the foundation for a global feedback system for the sawmill. The auditing computer can develop a database correlating logs and cants with final pieces of lumber and thus determine whether or not the entire sawmill is realizing the optimal value from each processed log.

In one embodiment, lumber in a sawmill may be tracked by determining at least one geometric characteristic of a piece of lumber and logically associating the piece of lumber with at least one of a log or a cant from which the piece of lumber was sawn.

In another embodiment, a system for tracking lumber in a sawmill includes at least one lumber laser scanner positioned to scan a number of pieces of lumber. A computing device may then receive data from the at least one lumber laser scanner in order to determine at least one geometric characteristic of a piece of lumber and logically associate the piece of lumber with at least one of a log or a cant from which the piece of lumber was sawn.

In another embodiment, lumber in a sawmill may be tracked by determining at least one geometric characteristic of a sideboard; determining at least one geometric characteristic of a cant; and logically associating the sideboard with the cant based at least in part on the at least one geometric characteristic of the sideboard and the at least one geometric characteristic of the cant.

In still another embodiment, a system for tracking lumber in a sawmill includes a first laser scanner positioned to scan sideboards near an infeed of an edger; a second laser scanner positioned to scan cants near an infeed of a gangsaw; and at least one computing device coupled to the first laser scanner and the second laser scanner. The at least one computing device may be configured to determine at least one geometric characteristic of a sideboard, determine at least one geometric characteristic of a cant, and logically associate the sideboard with the cant based at least in part on the at least one geometric characteristic of the sideboard and the at least one geometric characteristic of the cant.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sawmills, bucking and merchandizing processes, primary breakdown machines, gangsaws, edgers, trimmers, saws, computing devices, imaging systems and/or laser scanners have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Example System for Tracking Lumber in a Sawmill

Figure 1:
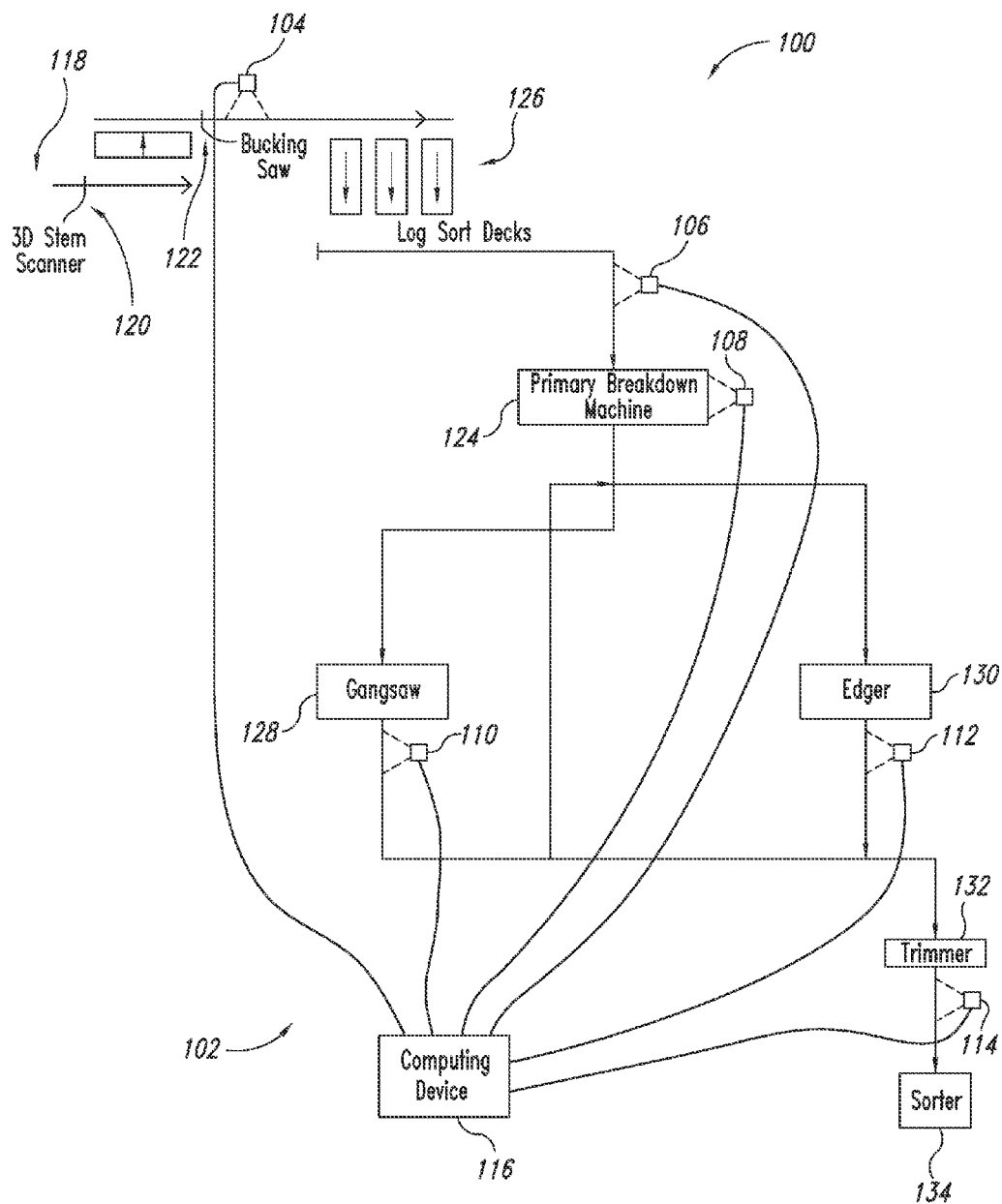
FIG. 1 is a schematic view of an example sawmill incorporating a system for tracking lumber, according to one illustrated embodiment.

FIG. 1 is a schematic view of an example sawmill 100 incorporating a system 102 for tracking lumber, according to one illustrated embodiment.

As illustrated, the system 102 for tracking lumber includes a plurality of scan zones, including a bucking scan zone 104, a log segment scan zone 106, a primary breakdown scan zone 108, a gangsaw scan zone 110, an edger scan zone 112 and a trimmer scan zone 114. Each of these scan zones may be coupled to a central computing device 116, which forms part of the lumber tracking system 102. Although the lumber tracking system 102 includes six scan zones, other systems for tracking lumber may include more or fewer scan zones, and the scan zones may be in different locations and differently configured. For example, in one embodiment, any one of the illustrated scan zones may be the only scan zone used in the system for tracking lumber. In addition, in one embodiment, each of the scan zones may be independent of the scanning systems of the sawmill 100 used for lumber positioning and optimization. However, in other embodiments, these scanning systems may be integrated.

In one embodiment, each scan zone includes one or more laser scanners positioned to scan a number of pieces of lumber. In other embodiments, the scan zones may incorporate other imaging systems in order to generate images of the pieces of lumber. As used herein, lumber is a broad term, referring to any piece of wood, including, for example, uncut, undebarked logs, partially processed logs, log segments, cants, sideboards, flitches, edging strips, boards, finished lumber, etc. The term, log, unless apparent from its context, is also used in a broad sense and may refer to, inter alia, uncut, undebarked logs, partially processed logs or log segments.

The computing device 116 may be communicatively coupled to the scan zones and receive image data and/or other sensor data therefrom in order to determine at least one geometric characteristic for each piece of lumber. The computing device 116 may then logically associate a particular piece of lumber with at least one of a log or a cant from which the piece of lumber was sawn. Based on the image data received from the different scan zones, as will be described in greater detail below, a variety of acts may be performed by the computing device 116 in order to perform this logical association.

In one embodiment, the sawmill 100 receives full length tree trunks at 118. These full length tree trunks or logs may be debarked and then scanned at a 3D stem scanner 120. The 3D stem scanner 120 may be implemented as one or a plurality of planar laser scanners that generate image data along the length of each log. The image data for the logs may then be analyzed by a computer optimizer (not shown) in order to determine how best to saw or "buck up" the logs into log segments.

This process of deciding how to buck up a log into log segments is called merchandizing. In one embodiment, the computer optimizer performing the merchandizing uses a brute force simulation of all possible bucking options, simulating in addition all of the downstream sawing processes that will take place inside the sawmill 100 (e.g., primary breakdown, cant processing and edging). The merchandizing computer optimizer may also take into account the processing time for each individual log segment, the current market values for particular pieces of lumber, the effect of log "sweep" (or curvature) on recovery, etc.

After the merchandizing computer optimizer has determined how to buck up a particular log, the log may then be driven transversely or lineally through one or more bucking saws 122. The bucking saws 122 may be controlled by a programmable logic controller (PLC) or other automated system, which may in turn be controlled by the merchandizing computer optimizer.

Figure 2:
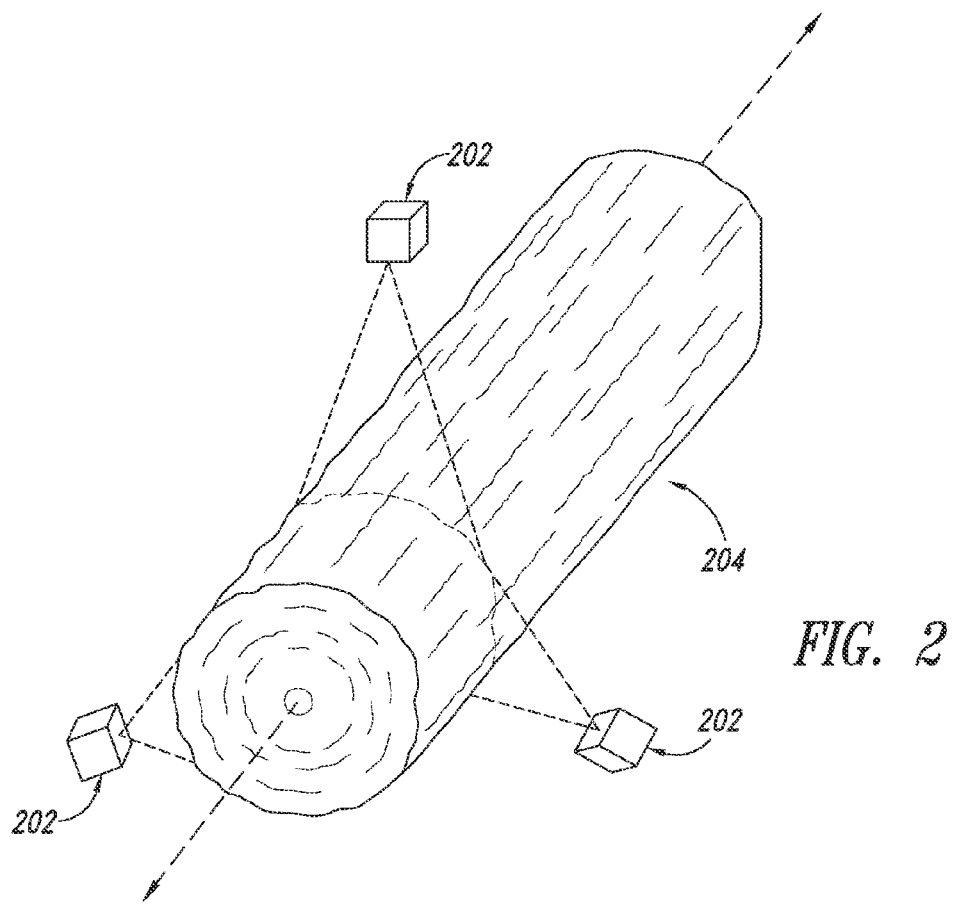
FIG. 2 is a perspective view of a bucking scan zone upstream from a primary breakdown machine for use in the system of FIG. 1.
Figure 3:
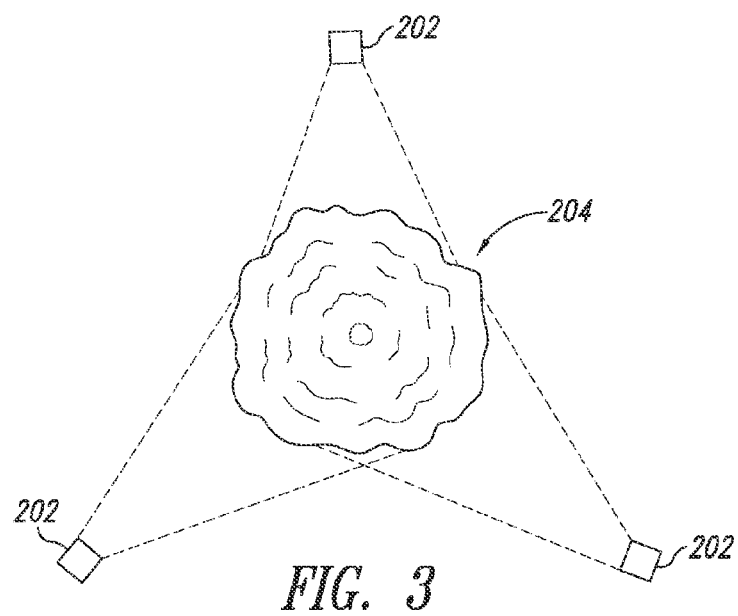
FIG. 3 is a front view of the scan zone of FIG. 2.

As illustrated in FIGS. 2 and 3, in one embodiment, the system 102 includes a bucking scan zone 104 located downstream from the bucking saws 122 and upstream from a primary breakdown machine 124. For example, the bucking scan zone 104 may be located just downstream from the bucking saws 122, before the log segments are sorted at log segment sort decks 126. In other embodiments, the bucking scan zone 104 may be positioned at any location downstream from the bucking saws 122.

The bucking scan zone 104 may include a plurality of planar laser scanners 202 spaced approximately every 120° around an axis along which a log segment 204 travels. In one embodiment, each planar laser scanner 202 includes at least one source of laser light and an image generator. The light source and image generator may generate a series of two dimensional images for analysis by the computing device 116. Planar laser scanners emit "lines" of laser light by rapidly moving a source of laser light back and forth. Meanwhile, an image sensor, for example a high resolution video camera, serves as the image generator, capturing the laser light reflected back towards the planar laser scanner 202. The video camera may comprise a charged coupled device (CCD) camera, or another optical system.

The image generator and the light source may use triangulation to determine the three dimensional shape of the illuminated surfaces. In other embodiments, other methods for determining a three-dimensional shape may be used, such as by measuring the time-of-flight of the laser light emitted by the light source. Commercially available laser scanners that may be used in the system 102 include those sold by JoeScan of Vancouver, Wash.

Different arrangements of laser scanners 202 may also be used to determine geometric characteristics of the log segments 204. For example, only a single planar laser scanner 202 may be used in certain embodiments. In other embodiments, two point laser scanners may be used to measure a single geometric characteristic of each log segment 204, such as its length.

In still other embodiments, different imaging systems may be used to determine the geometric characteristics of the log segments 204. The light source may comprise another collimated, non-laser light source or any other source of electromagnetic radiation, such as a more diffuse source of visible, infrared or ultraviolet radiation. The image generator may also be modified in alternative embodiments in order to generate images based on the reflected light.

In one embodiment, the planar laser scanners 202 forward image data representative of the scanned log segments 204 to the computing device 116 for analysis. The computing device 116 may determine at least one geometric characteristic of each log segment 204 based on this image data. The determined geometric characteristics may comprise any location, shape, size or pattern information. For example, the computing device 116 may determine a diameter or series of diameters along the log segment 204, a precise length of the log segment 204, a value representative of curvature/sweep of the log segment 204, values representative of how the curvature/sweep of the log segment 204 changes along its length, a value representative of the surface roughness of the log segment 204, or values indicative of a grain pattern of the log segment 204.

The computing device 116 may also be communicatively coupled to the merchandizing computer optimizer and may receive information regarding which log the log segment 204 was bucked from (using, for example, a sequence number or other identifier). The computing device 116 may also receive information regarding to which sort deck the log segment 204 will be sent. In other embodiments, the merchandizing computer optimizer and the computing device 116 may be incorporated into the same computing system.

In one embodiment, the computing device 116 may then logically associate the scanned log segments 204 with the logs from which the log segments 204 were bucked. In one embodiment, this logical association may be simplified by the above-described communication with the merchandizing computer optimizer. In other embodiments, the computing device 116 may receive image data from the 3D stem scanner 120 and compare the image data from the 3D stem scanner 120 with the image data received from the bucking scan zone 104. Comparison of the image data may include comparisons of any of the geometric characteristics determined based on the image data. For example, the computing device 116 may compare the diameter, sweep, surface roughness, grain pattern and length of the log segments 204 against the corresponding geometric characteristics of the processed logs. The computing device 116 may then logically associate a log segment 204 with a particular log when corresponding geometric characteristics are detected. In another embodiment, the queue of logs and log segments between the 3D stem scanner 120 and the bucking scan zone 104 is relatively small, such that relatively few comparisons between the geometric characteristics of the log segments 204 and logs need be made. In such an embodiment, the geometric characteristics determined by the computing device 116 may be less detailed, as a smaller population of log segments 204 might make it more likely that each characteristic of each log segment is unique in that population.

In another embodiment, the bucking scan zone 104 may not be a separate, physical scan zone. Instead, the computing device 116 may receive image data from the merchandizing computer optimizer or 3D stem scanner 120.

By associating each log segment 204 with a corresponding log from which it was bucked, the computing device 116 may provide feedback or "auditing" information to the sawmill personnel regarding the performance of the merchandizing system. For example, if the log segments predicted by the merchandizing computer optimizer do not match the scanned log segments 204, then mechanical or programming adjustments may need to be made.

In one embodiment, the computing device 116 may perform an independent optimization analysis based at least in part on the image data from the bucking scan zone 104. For example, the computing device 116 may determine an optimal merchandizing solution for each log (using, in one embodiment, a method similar to that implemented by the merchandizing computer optimizer). The computing device 116 may determine the optimal merchandizing solution for each log based on image data from the 3D stem scanner 120 or based on a "reconstructed" version of each log based on image data from the log segments 204 corresponding to that log. The merchandizing solution determined at the computing device 116 may then be compared against the merchandizing solution determined at the merchandizing computer optimizer to provide an independent audit of the merchandizing computer optimizer's efficiency. The merchandizing solution determined at the computing device 116 may also be compared against the scanned log segments 204. Differences between the optimal merchandizing solution of the computing device 116 and the log segments 204 may originate from a number of sources, including a different optimization algorithm applied by the merchandizing computer optimizer, scanning issues at the 3D scan zone 120, mechanical issues with the bucking saws 122, etc.

In another embodiment, the computing device 116 may also determine an optimal value for a log, corresponding to an optimal mix of lumber that might be obtained from the log, determined by any of a variety of algorithms. In one embodiment, the estimated optimal value may take into account up-to-date market information for lumber. The computing device 116 may then determine an optimal value for each log segment 204 bucked from that log, again corresponding to the optimal mix of lumber that might be obtained from each log segment 204. The sum of the log segment values may then be compared against the log value in order to determine whether or not the merchandizing system is realizing the optimal value from each log. In another embodiment, the optimal value for the log may correspond to a range of historical values realized from logs having similar geometric characteristics. In yet another embodiment, the optimal value for the log may correspond to an extrapolated value based on historical values realized from logs having varying geometric characteristics. In another embodiment, the optimal value for the log may correspond to a standard value corresponding to the log's geometric characteristics.

Of course, the "optimal" values and solutions determined by the computing device 116 are approximate and may not represent theoretically optimal values and solutions.

Returning to FIG. 1, after the bucking process, the log segments 204 may be sorted at the log sort decks 126 prior to further processing in the sawmill 100. The log segments 204 may then be transported to a primary breakdown machine 124.

Upstream from the primary breakdown machine 124, the log segments 204, in one embodiment, may be scanned at a log segment scan zone 106. Although illustrated in FIG. 1 near a conveyor leading to the primary breakdown machine 124, the log segment scan zone 106 may also be positioned at other locations upstream from the primary breakdown machine 124.

The log segment scan zone 106 may be configured similarly to the bucking scan zone 104, as illustrated in FIGS. 2 and 3. For example, the log segment scan zone 106 may include a plurality of planar laser scanners spaced approximately every 120° around an axis along which the log segment 204 travels. However, the log segment scan zone 106 may, of course, have a different arrangement, and different imaging systems may be used.

In one embodiment, as at the bucking scan zone 104, the laser scanners of the log segment scan zone 106 may forward image data representative of the scanned log segments 204 to the computing device 116 for analysis. The computing device 116 may determine at least one geometric characteristic for each log segment 204 based on the received image data. The computing device 116 may, for example, determine a diameter, sweep, surface roughness, grain pattern or length for each log segment 204. In other embodiments, other geometric characteristics of the log segments 204 may also be determined.

The computing device 116 may then logically associate the scanned log segments 204 with the logs from which the log segments 204 were bucked. In one embodiment, the computing device 116 may logically associate a log segment 204 with a particular log by comparing the image data and corresponding geometric characteristics from the bucking scan zone 104 and the log segment scan zone 106. Once a log segment 204 with matching geometric characteristics is found in these two scan zones, the computing device 116 may apply the techniques discussed above in order to track that log segment 204 back to a particular log. In another embodiment, the system 102 may lack a bucking scan zone 104, and the computing device 116 may apply the techniques discussed above in order to logically associate a log segment 204 scanned at the log segment scan zone 106 with a corresponding log.

In other embodiments, the logical association may be based at least in part on an "ordering" of the log segments 204. For example, the computing device 116 may logically associate a log segment 204 with a log based at least in part on the log sort deck 126 into which the log segment 204 was sorted and based on a memory queue for that log sort deck 126. Then, based on information from the merchandizing computer optimizer or based on image data from the bucking scan zone 104, the log segment 204 may be matched with a particular log as described above. In still other embodiments, the log segments 204 may be "scrambled" within each log sort deck 126 (in other words, the log sort decks 126 may not operate perfectly according to a first-in-first-out (FIFO) scheme), and the computing device 116 may then use information regarding the log sort deck 126 into which the log segment 204 was sorted as well as the log segment's geometric characteristics in order to logically associate the log segment 204 with a corresponding log from which the log segment 204 was bucked.

The computing device 116 may be further configured to determine an optimal value for each log, corresponding to an optimal mix of lumber that might be obtained from the log. As described above with reference to the bucking scan zone 104, this optimal value may then be compared against an estimated optimal value for the log segments 204 bucked from the log in order to determine whether or not the merchandizing system is operating efficiently.

The log segments 204 may then be transported the rest of the way to the primary breakdown machine 124. The primary breakdown machine 124 processes the log segments 204 to produce cants and may include chip heads for removing slab wood as well as one or more saws (e.g., round saws or band saws) for sawing sideboards from the cants.

In one embodiment, each log segment 204 may be scanned by a breakdown optimization scanning system prior to processing at the primary breakdown machine 124. This breakdown optimization scanning system may be separate from the lumber tracking system 102 described herein, although in certain embodiments, image data from the breakdown optimization scanning system may be used by the lumber tracking system 102 to replace one or more of the scan zones.

After scanning each log segment 204, a primary breakdown computer optimizer may analyze the geometry of each log segment 204 to determine an optimal mix of lumber that might be obtained. Based on that determination, the primary breakdown computer optimizer may control the rotation and movement of each log segment 204 as well as the relative position of the chip heads and saws with respect to each log segment 204.

In another embodiment, the functionality of the primary breakdown computer optimizer may be incorporated into the computing device 116, and the log segment scan zone 106 may provide image data to the computing device 116 for the primary breakdown optimization as well as the lumber tracking described herein. However, in other embodiments, the hardware of the lumber tracking system 102 may be kept separate to ensure an independent audit.

Figure 4:
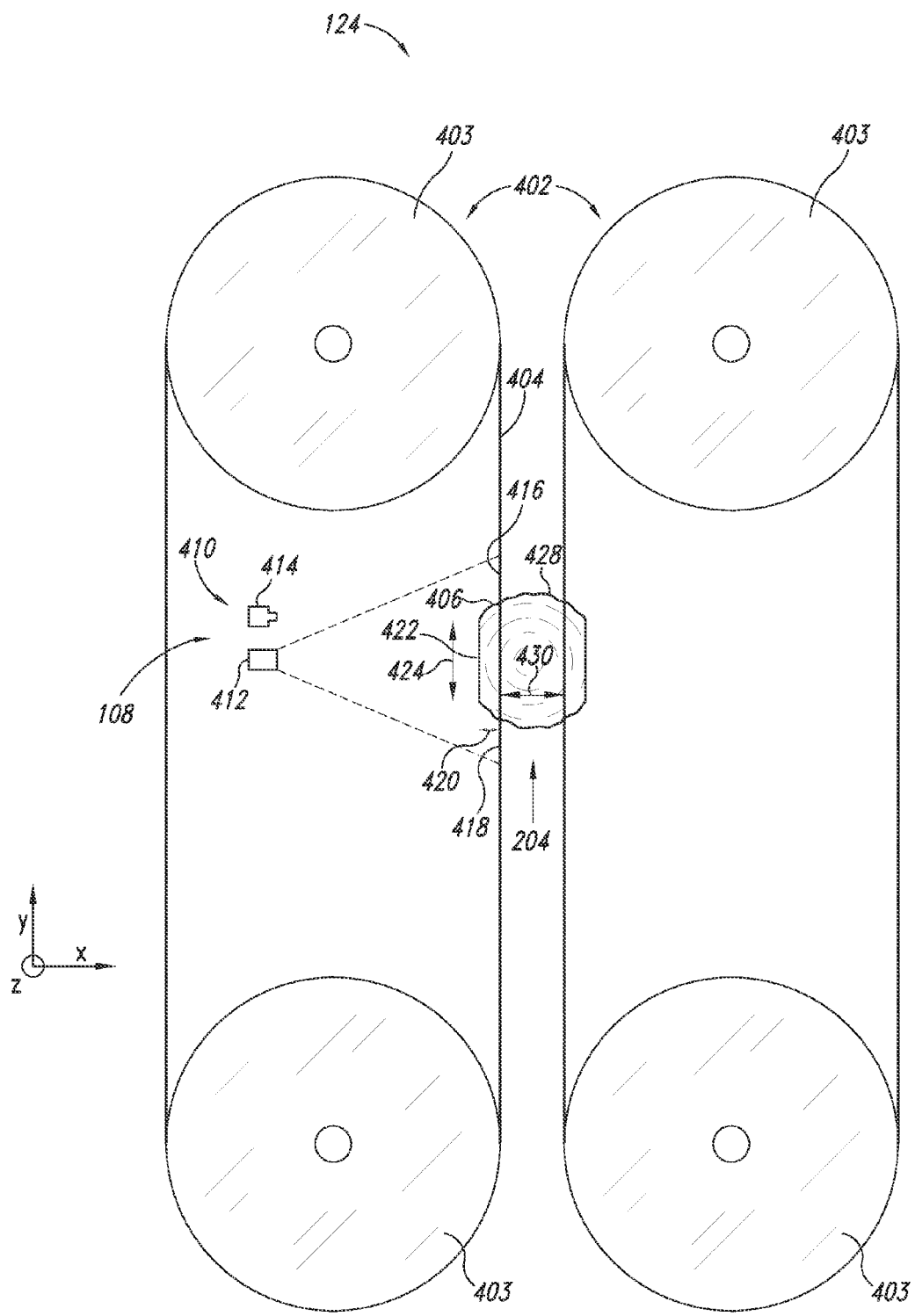
FIG. 4 is a front schematic view of a primary breakdown scan zone adjacent a primary breakdown machine for use in the system of FIG. 1.
Figure 5:
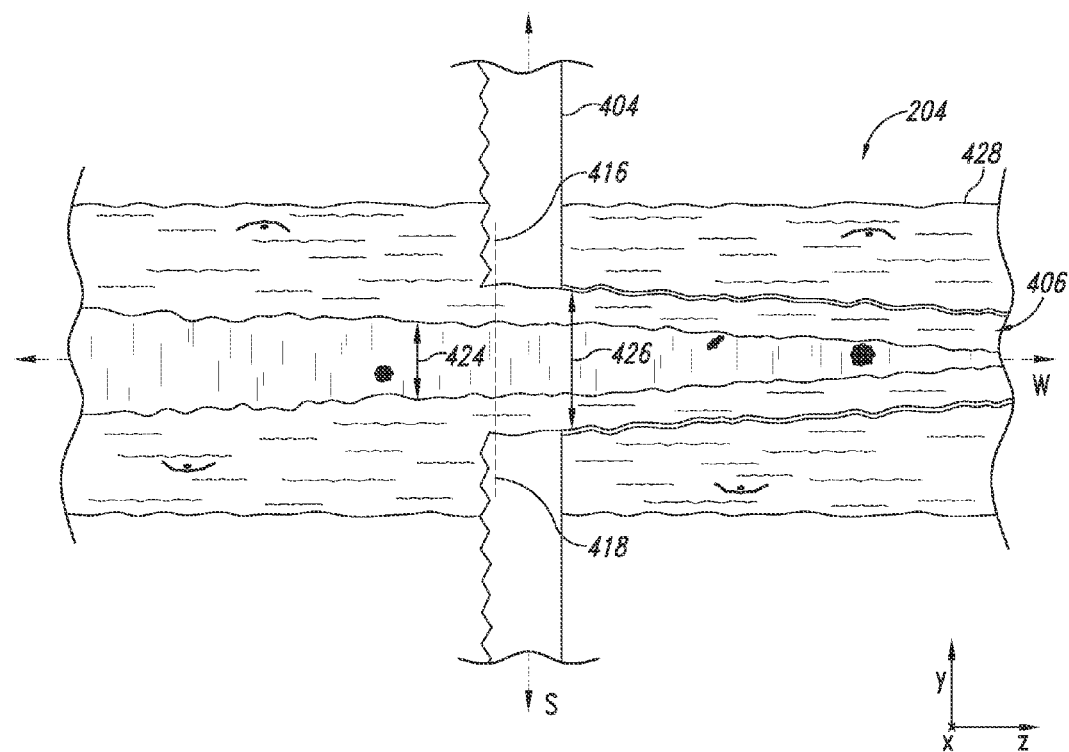
FIG. 5 is a side elevational view of a light source of the primary breakdown scan zone of FIG. 4 positioned to illuminate a saw blade and a sideboard.

As illustrated in FIG. 4, a primary breakdown scan zone 108 may be positioned adjacent the primary breakdown machine 124. The primary breakdown machine 124 may comprise a pair of band saws 402 with nearby chip heads (not shown). Each band saw 402 may further include top and bottom wheels 403 that rotate in order to drive a saw blade 404 in a clockwise or counterclockwise direction, as well as saw guides (not shown) positioned to minimize deflection of the saw blades. FIG. 5 is a side view of the primary breakdown scan zone 108 of FIG. 4.

FIGS. 4 and 5 further include a coordinate system to facilitate discussion of the illustrated embodiments. As shown, the teeth of the saw blades 404 face the rear of FIG. 4, in the negative z-direction, and the log segment 204 travels generally in the positive z-direction during sawing. The saw blades 404 may move up or down parallel to the y-axis in order to saw the log segment 204, while the log segment 204 or the saw blades 404 may be moved parallel to the x-axis to adjust the thicknesses of the sideboards 406.

The primary breakdown scan zone 108 may be positioned to generate image data of a saw blade 404 of the band saw 402 and the sideboard 406 sawn from the log segment 204. In one embodiment, the primary breakdown scan zone 108 includes at least one planar laser scanner 410, including a light source 412 positioned to illuminate the sideboard 406 and the saw blade 404 and an image generator 414 positioned to generate an image of the illuminated surfaces. In one embodiment, the light source 412 is positioned to illuminate a first exposed surface 416 of the saw blade 404 to one side of the sideboard 406, and a second exposed surface 418 to another side of the sideboard 406. Although not illustrated, in one embodiment, a second planar laser scanner is similarly arranged at the other band saw 402 in order to image the corresponding saw blade 404 and sideboard 406.

The light source 412 may be positioned to face the saw blade 404 at approximately a right angle. As illustrated, the light source 412 is positioned such that a line of light produced by the light source 412 is approximately centered about a central axis W of the log segment 204, and is aligned near the teeth of the saw blade 404. In one embodiment, the light source 412 may be fixed relative to the saw blade 404. In such an embodiment, when cutting log segments 204 having different diameters, the light source 412 may be more or less displaced with respect to the central axis W of the log segment 204. In other embodiments, to achieve improved illumination, the light source 412 may be movable in the y-direction. For example, a stepper motor controlled by the computing device 116 may be used, in one embodiment, to position the light source 412 for each new log segment 204.

Other orientations of the light source 412 relative to the saw blade 404 and log segment 204 may also be used. For example, the light source 412 may be displaced in any direction with respect to the central axis S of the saw blade 404 and the central axis W of the log segment 204 but angled to produce a line of laser light along the saw blade 404 and log segment 204. In other embodiments, the light source 412 may illuminate different portions of the saw blade 404 and log segment 204, or a source of more diffuse light may be used to generally illuminate the saw blade 404 and log segment 204. In still other embodiments, the planar laser scanner 410 may be positioned to image the log segment 204 downstream or upstream from the primary breakdown machine 124 and need not also image the saw blade 404.

The planar laser scanner 410 may be configured similarly to the planar laser scanner 202 described in detail above, although other configurations, and other imaging systems are possible in alternative embodiments.

In one embodiment, image data from the image generator 414 is sent to the computing device 116 for analysis. The computing device 116 may determine at least one geometric characteristic of the sideboard 406 based on the received image data. The geometric characteristics may comprise location, shape, wane, face, size or grain pattern information based on the imaged surfaces. For example, in one embodiment, the computing device 116 may determine a thickness 420 of the sideboard 406 based on the relative location of the exposed surfaces 416, 418 of the saw blade 404 and a face 422 of the sideboard 406. The computing device 116 may also determine a width 424 of the face 422. In still another embodiment, based on the distance between a top and bottom edge of the sideboard 406, the computing device 116 may determine a width 426 of an opposite face of the sideboard 406 adjacent the saw blade 404. In still another embodiment, the computing device 116 may determine size and shape geometry of the wane of the sideboard 406 (i.e., the non-flat surfaces of the sideboard 406).

The geometric characteristics determined by the computing device 116 may further include a number of ratios or other geometric relationships. For example, the computing device 116 may determine a ratio of the width 424 to the width 426 at different points along the length of the sideboard 406. In one embodiment, a single ratio may be determined at each foot along the length of the sideboard 406, which may then serve as a unique identifier or "fingerprint" of the sideboard 406. Thus, a relatively small amount of geometric data may be stored in order to uniquely identify each sideboard.

In one embodiment, the computing device 116 may also logically associate the sideboards 406 with the log segment 204 or cant 428 from which the sideboards 406 have been sawn. In one embodiment, this logical association may be performed by comparing geometric characteristics of the sideboards 406 with geometric characteristics of the log segments 204, as scanned at the bucking scan zone 104 or log segment scan zone 106. In another embodiment, the sideboards 406 may simply be logically associated with the log segment 204 or cant 428 from which they are currently being sawn. In yet another embodiment, log segments 204 may be scanned at the log segment scan zone 106 and at the primary breakdown scan zone 108 in substantially the same order, and this ordering may be used to associate sideboards 406 with respective log segments 204.

The computing device 116 may further determine at least one geometric characteristic of the cant 428 sawn at the primary breakdown machine 124. For example, in one embodiment, the computing device 116 may determine a width of a new face of the cant 428 adjacent the saw blade 404. This width may correspond approximately to the width 426 of the opposing face of the sideboard 406 and may be determined similarly. In another embodiment, a thickness 430 of the cant 428 may be determined based on a distance between the saw blades 404 of the two band saws 402. These geometric characteristics may also be used to logically associate the cant 428 with a log from which the cant 428 has been sawn, as described above.

By associating the sideboards 406 and cants 428 with corresponding logs or log segments 204, the computing device 116 may provide feedback information to the sawmill personnel regarding the performance of the primary breakdown processing station. If the sideboards and cants predicted by the primary breakdown computer optimizer are not matching the scanned sideboards 406 and cants 428, then mechanical or programming adjustments may need to be made. For example, the thickness 420 of the sideboard 406 may not match a predicted thickness, or the width of the new face of the cant 428 may not match a predicted width. With the feedback from the computing device 116, the primary breakdown computer optimizer may adjust to correct such problems. In another embodiment, the computing device 116 may detect deflection of the saw blades 402 and may cause the primary breakdown computer optimizer to adjust the speed at which log segments 204 are transported through the primary breakdown machine 124.

In another embodiment, the computing device 116 may also perform an independent optimization analysis based at least in part on image data from the primary breakdown scan zone 108. For example, the computing device 116 may determine an optimal rotation and primary breakdown sawing process for a particular log segment 204 (using, in one embodiment, a method similar to that implemented by the primary breakdown computer optimizer). This optimal rotation and primary breakdown sawing process may then be compared against the rotation and primary breakdown sawing process determined at the primary breakdown computer optimizer to provide an independent audit of the primary breakdown computer optimizer's efficiency. The optimal rotation and primary breakdown sawing process may also be compared against the scanned sideboards 406 and cants 428. Differences between the optimal rotation and primary breakdown sawing process and the scanned sideboards 406 and cants 428 may originate from a number of sources, including a different optimization algorithm applied by the primary breakdown computer optimizer, scanning issues at the breakdown optimization scanning system, mechanical sawing or rotation issues, etc.

In one embodiment, the computing device 116 may also determine an optimal value for each sideboard 406 and cant 428 sawn from a corresponding log or log segment 204. The sum of these optimal values may then be compared with an optimal value for the corresponding log or log segment 204 in order to determine whether or not the sawmill 100 is realizing the optimal value from each log or log segment 204.

Figure 6:
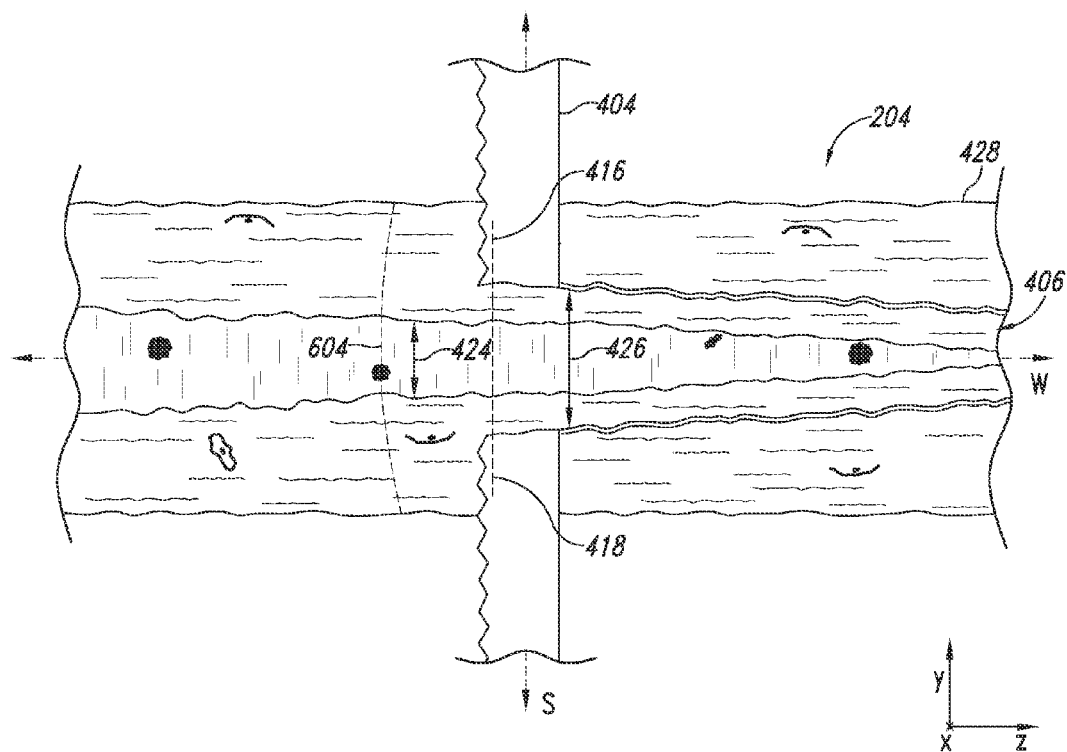
FIG. 6 is a side elevational view of an alternative primary breakdown scan zone adjacent a primary breakdown machine for use in the system of FIG. 1.

FIG. 6 illustrates another embodiment of the primary breakdown scan zone 108, including a second light source 602 positioned to illuminate an upstream portion 604 of the log segment 204.

The second light source 602 may be configured similarly to the light source 412. For example, both the second light source 602 and the light source 412 may comprise sources of laser light moved rapidly back and forth to generate lines of laser light, as in a planar laser scanner. In still other embodiments, a single light source may be used. The second light source 602 may also be a structurally separate component or may be housed in the same housing as the light source 412 and the image generator 414.

In one embodiment, the second light source 602 is generally aligned with the central axis W of the log segment 204 and is configured to illuminate approximately 120° of a surface of the upstream portion 604. Since, in one embodiment, a pair of bandsaws may be used with a corresponding pair of planar laser scanners, approximately 240° of the surface of the upstream portion 604 of the log segment 204 may be illuminated.

The image generator 414 may generate image data from the illuminated upstream portion 604 of the log segment 204, and the computing device 116 may determine geometric characteristics of the sideboards 406, log segments 204 and cants 428 based on this image data. The geometrical characterization and subsequent logical association of the sideboards 406, log segments 204 and cants 428 with respective logs and cants may be undertaken as is generally described above with respect to image data originating with the light source 412.

Figure 7:
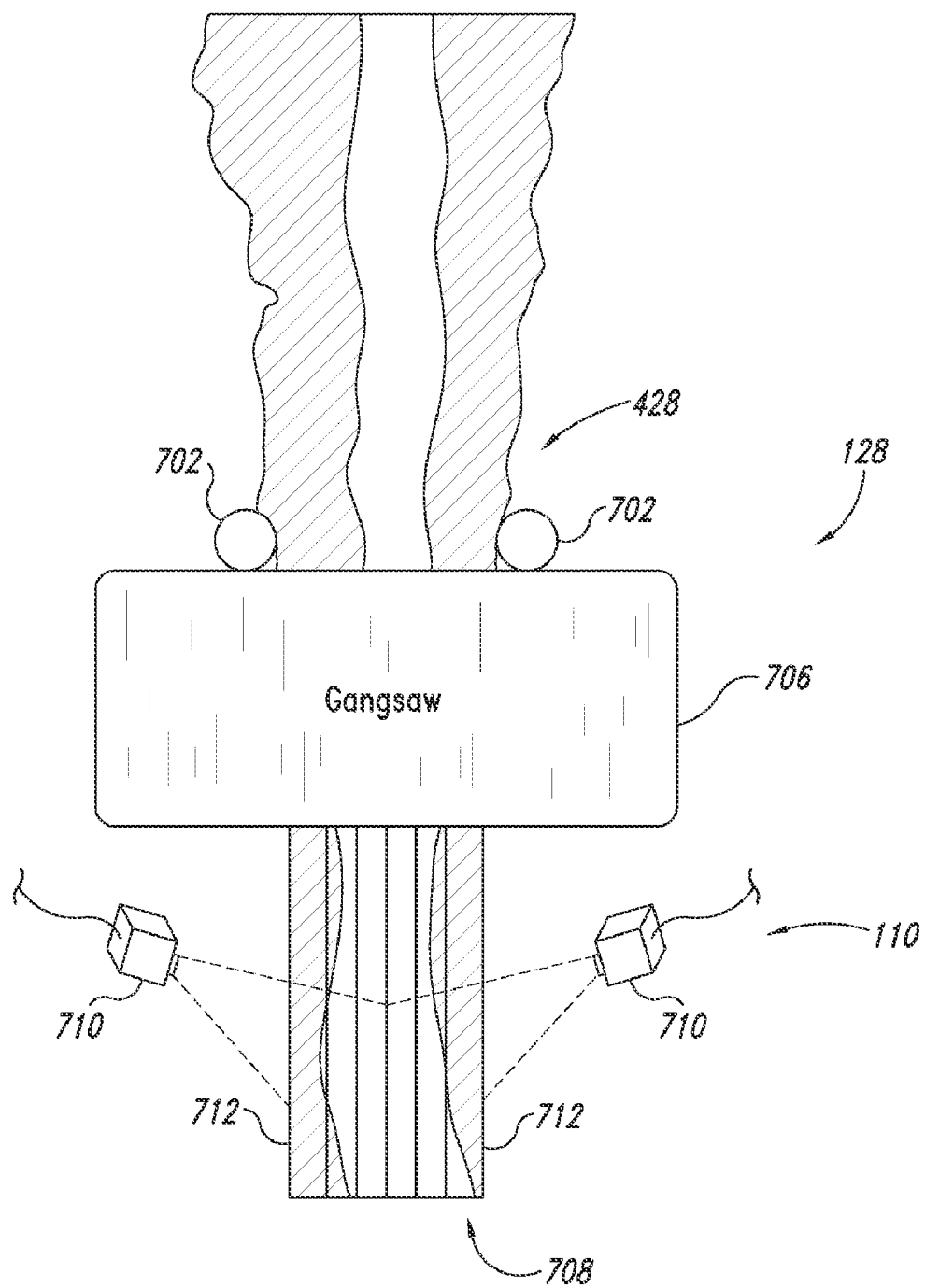
FIG. 7 is a top plan view of a gangsaw scan zone for use in the system of FIG. 1.

After processing at the primary breakdown machine 124, the cants 428 may be transported for further processing at a gangsaw 128, as illustrated in FIG. 7. In other embodiments, other machines may be used to further break down the cants 428. For example, a series of band saws, commonly known as "resaws," may be used. Such resaws may saw one or more boards at a time from the cants 428.

The gangsaw 128 may also have any of a number of configurations. For example, the gangsaw 128 may be either a single arbor or a double arbor gangsaw having a number of parallel, circular saw blades located at precise intervals within a sawbox 706. The gangsaw 128 may also include more saw blades than are used to saw each arriving cant 428, and the gangsaw 128 may be controlled to distribute the sawing workload among the saw blades to ensure that certain saw blades are not over-utilized while others are under-utilized. At the front of the sawbox 706, the gangsaw 128 may further include chip heads 702, such as vertical drum chip heads, that remove excess wood from the outside of each cant 428.

Although not illustrated, in one embodiment, the cants 428 may be scanned either transversely or lineally before they arrive at the gangsaw 128. This scanning may be used to derive information regarding the geometry of the cants 428, and a gangsaw computer optimizer may use this information to determine an optimal way to saw each cant 428 into a plurality of boards. As discussed above, the gangsaw computer optimizer may form an integral part of or be separated from the lumber tracking system 102 described herein. Based on the determined optimal sawing process, the gangsaw computer optimizer may send appropriate commands to a PLC that then directly controls the gangsaw 128 during sawing.

Figure 8:
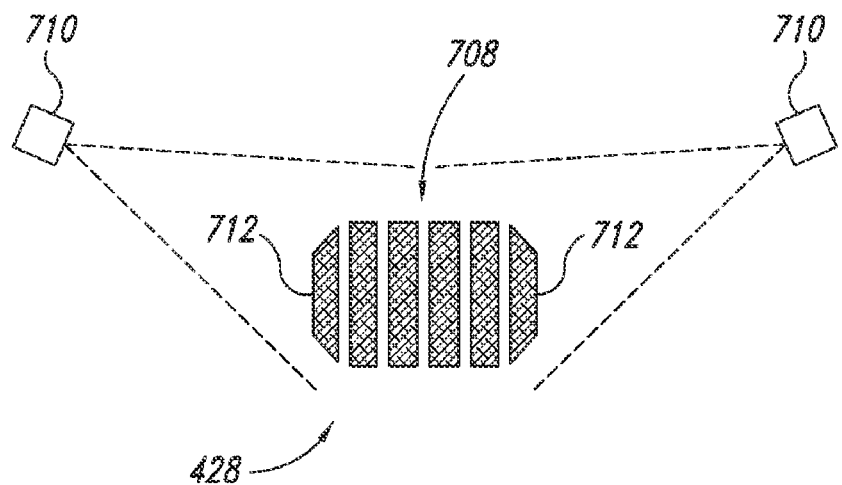
FIG. 8 is a front view of the gangsaw scan zone of FIG. 7.
Figure 9:
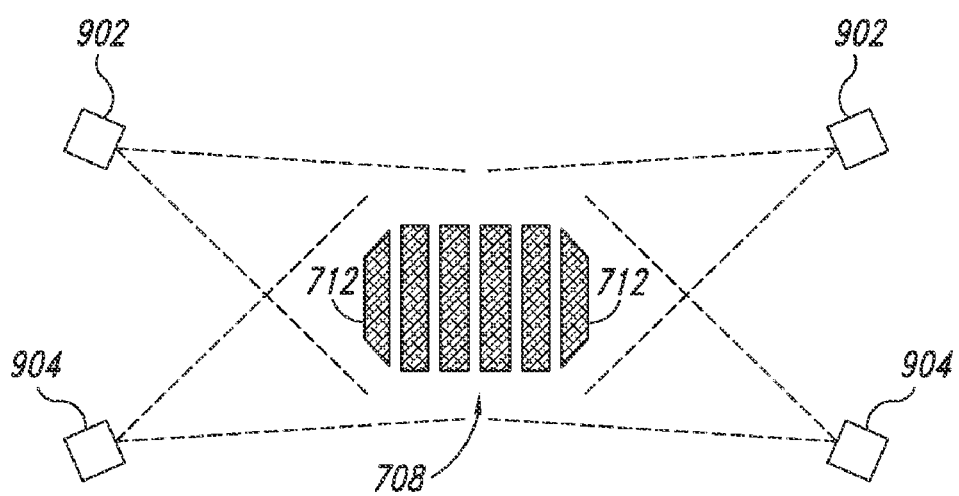
FIG. 9 is a front view of an alternative gangsaw scan zone for use in the system of FIG. 1.
Figure 10:
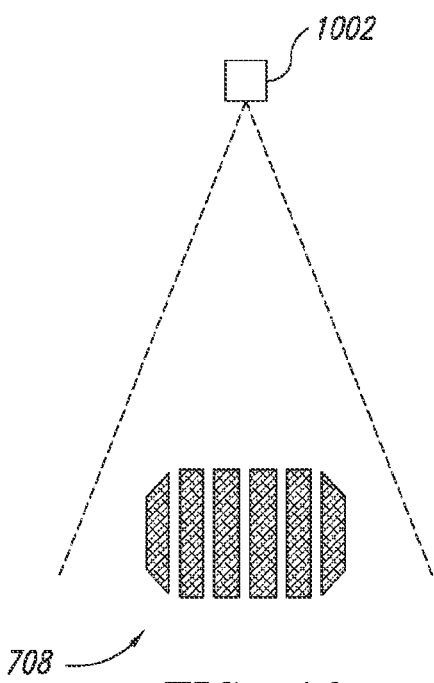
FIG. 10 is a front view of another alternative gangsaw scan zone for use in the system of FIG. 1.

As illustrated in FIGS. 7 and 8, in one embodiment, the gangsaw scan zone 110 may include two planar laser scanners 710 positioned at the outfeed of the gangsaw 128 in order to scan boards 708 in a partially sawn configuration. In another embodiment, as illustrated in FIG. 9, a four scanner configuration may be used, such that bottom laser scanners 904 scan the bottom edges of the boards 708, while top laser scanners 902 scan the top edges of the boards 708. In still another embodiment, a single planar laser scanner 1002 may be used, as illustrated in FIG. 10.

After the cant 428 has been completely sawn by the gangsaw 128, the boards 708 may emerge from the gangsaw 128, fall apart, and be transported for some distance lineally along a rollcase or belt conveyor. The rollcase may include keystock welded to the rolls in order to bounce the boards 708 up and down in order to remove most of the sawdust. This bouncing may also tend to flatten the boards 708 out as it separates them. When the boards 708 emerge from the gangsaw 128, they may be arranged near each other and in the same order in which they were sawn by the gangsaw 128 (i.e., the third board from the left on the rollcase was also the third board from the left during the sawing process).

Figure 12:
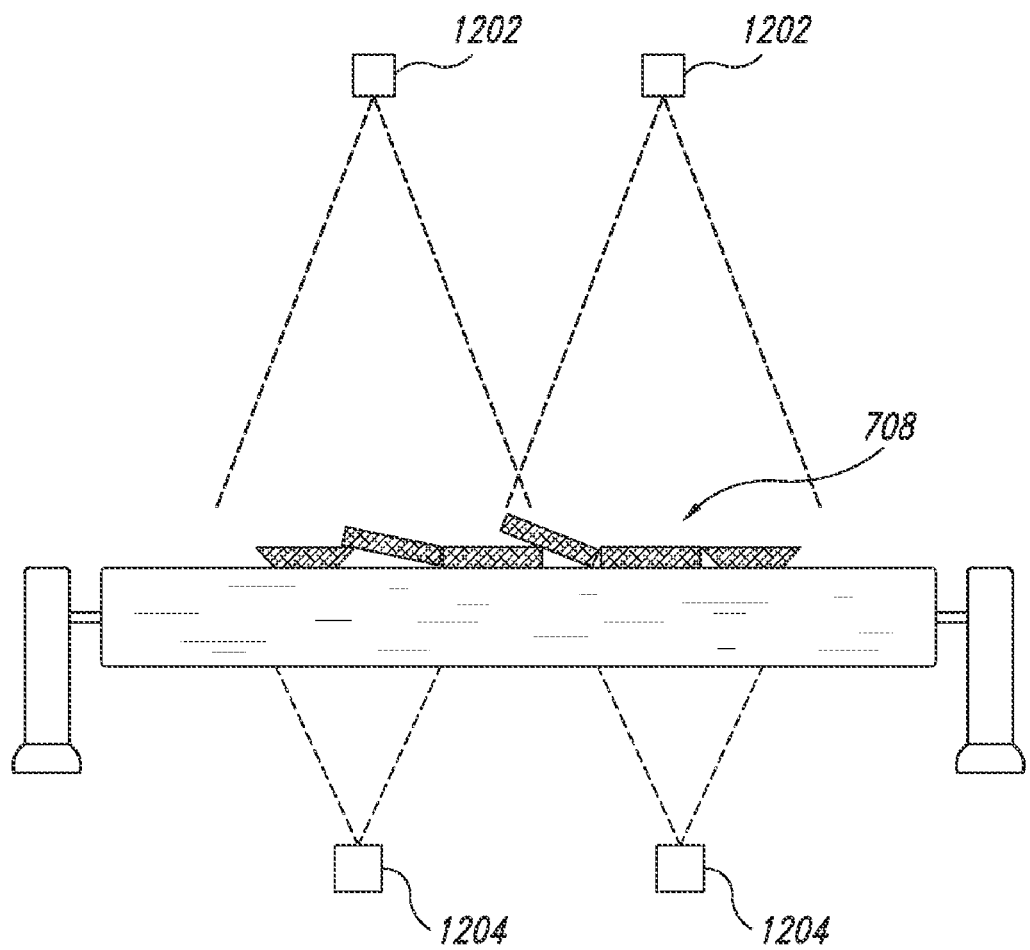
FIG. 12 is a front view of yet another alternative gangsaw scan zone for use in the system of FIG. 1.

As illustrated in FIG. 12, in an alternative embodiment, the gangsaw scan zone 110 may be positioned further from the gangsaw outfeed in order to get more detailed image data representative of the sawn boards 708. The gangsaw scan zone 110 may include four planar laser scanners 1202, 1204 positioned to scan the boards 708 lineally as they are transported from the gangsaw 128. These four laser scanners 1202, 1204 may be configured similarly to other laser scanners discussed herein and may send image data to the computing device 116 for analysis.

Different arrangements of laser scanners may also be used to determine geometric characteristics of the boards 708. The laser scanners may also be positioned at still other locations downstream from the gangsaw 128. In other embodiments, different imaging systems may also be used. The light source may comprise another collimated, non-laser light source or another, more diffuse source of electromagnetic radiation. The image generator may also be modified in alternative embodiments.

In one embodiment, the computing device 116 may process image data from any of the example gangsaw scan zones 110 described above in order to determine at least one geometric characteristic of each board 708. For example, in one embodiment, the computing device 116 may determine a thickness along at least one edge of each board 708. The computing device 116 may also determine geometric characteristics of the wane and outside faces of the outside boards 712. In another embodiment, the computing device 116 may determine width and length characteristics for each board 708.

The computing device 116 may be further configured to logically associate the boards 708 with at least one of a log or a cant 428 from which the boards 708 were sawn. In one embodiment, the computing device 116 may compare geometric characteristics of the boards 708, individually or as a collective, with geometric characteristics of the cants 428 or logs from other scan zones in the lumber tracking system 102. The computing device 116 may then logically associate a board 708 with a particular cant 428 or log when corresponding geometric characteristics are detected. In another embodiment, the gangsaw scan zone 110 may be the only scan zone in the lumber tracking system 102, and the boards 708 may be associated with a log or a cant based on image data from previous optimization scans. In still another embodiment, the boards 708 may simply be logically associated with the cant 428 from which the boards 708 have just been sawn. In yet another embodiment, the logical association may be based at least in part on an order in which the cants 428 are processed at the gangsaw 128.

Figure 11:
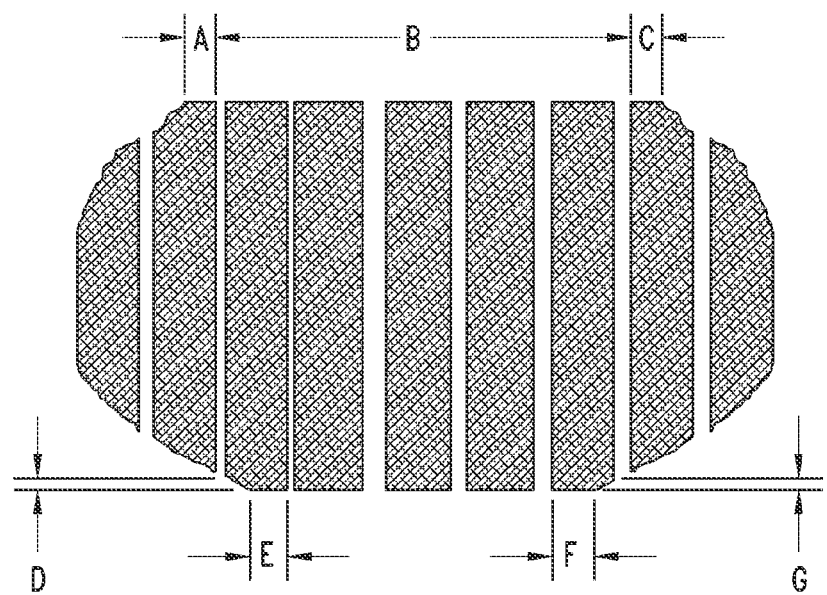
FIG. 11 is a cross-sectional view of a cant sawn by a gangsaw.

The computing device 116 may take advantage of this logical association in order to determine other geometric characteristics of the boards 708. For example, as illustrated in FIG. 11, the computing device 116 may first determine geometric characteristics corresponding to the cant face and corresponding boards 708 exposed to the laser scanners of the gangsaw scan zone 110 (e.g., measurements A, B and C). The computing device 116 may then logically associate the boards 708 with a corresponding log or cant 428 from which the boards 708 have been sawn. Based on this logical association, image data from an upstream scan zone may then be used by the computing device 116 to determine "hidden" geometric characteristics of the boards 708 (e.g., measurements D, E, F and G).

The computing device 116 may also provide feedback information to the sawmill personnel regarding the performance of the gangsaw processing station. For example, if the boards predicted by the gangsaw computer optimizer do not match the scanned boards 708, then mechanical or programming adjustments may need to be made.

In another embodiment, the computing device 116 may also perform an independent optimization analysis based at least in part on image data from the gangsaw scan zone 110, similar to the optimization analysis and comparison described above with respect to the primary breakdown scan zone 108.

In one embodiment, the computing device 116 may also determine a value for the boards 708 emerging from the gangsaw 128. As described above, the computing device 116 may also determine an optimal value corresponding to a log or cant 428 from which the boards 708 have been sawn. The value of the boards 708 may then be compared with the optimal value of the corresponding log or cant in order to determine whether or not the sawmill 100 is realizing the optimal value from each log or cant. Differences between the optimal and realized values may stem from defects at any of the processing stations in the sawmill 100 between receipt of a log at 118 and the outfeed of the gangsaw 128.

Returning to FIG. 1, in one embodiment, the boards 708 from the gangsaw 128 and the sideboards 406 from the primary breakdown machine 124 may be further processed by an edger 130. The edger 130 may be associated with yet another scanning and optimization system and may include one or more movable saws for sawing along the length of each board.

Figure 13:
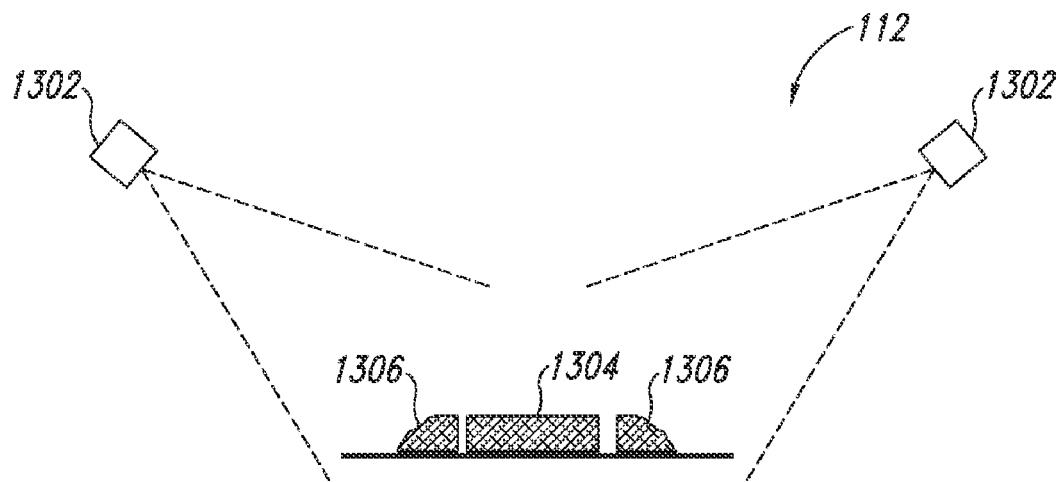
FIG. 13 is a front view of an edger scan zone for use in the system of FIG. 1.

As illustrated at FIG. 13, the lumber tracking system 102 may include an edger scan zone 112 downstream from the edger 130 having one or more planar laser scanners 1302 positioned to scan an edged board 1304 as well as edging strips 1306. In another embodiment of the edger scan zone 112, illustrated in FIG. 14, only a single planar laser scanner 1402 may be used. In other embodiments, different arrangements of laser scanners or different imaging systems may be used.

Figure 14:
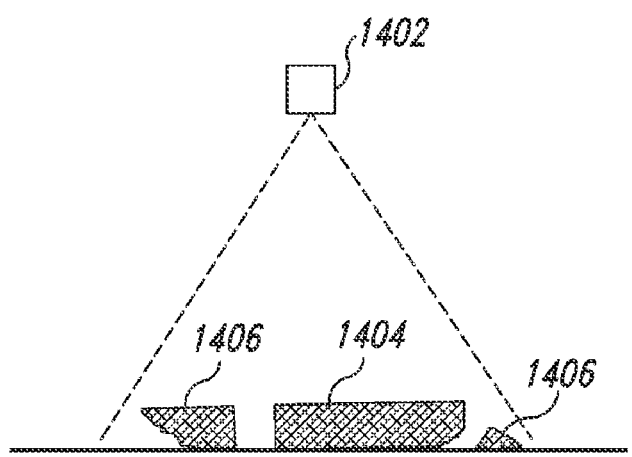
FIG. 14 is a front view of an alternative edger scan zone for use in the system of FIG. 1.

In FIG. 13, the board has been edged wane facing up, and so the laser scanners 1302 may scan substantially the entire "waney" surface of the edging strips 1306 as well as the edged board 1304. However, boards may also be edged wane facing down, as illustrated in FIG. 14. When a board is processed by the edger 130 wane down, it may be more difficult to obtain detailed image data from above, and additional steps may be taken in order to determine the geometric characteristics for the edged board 1404 and edging strips 1406.

The scanners of the edger scan zone 112 may send image data to the computing device 116 representative of the edged board and edging strips. Using this information, the computing device 116 may determine at least one geometric characteristic for the edged board, the edging strips, and/or the board prior to edging. In one embodiment, the computing device 116 may determine characteristics of the wane (such as curvature, extent along the length of the sideboard 406, etc.) of the edging strips. The computing device 116 may also determine widths, thicknesses and wane characteristics of the edged boards.

The computing device 116 may be further configured to logically associate the edged board and the edging strips with at least one of a log or a cant from which these pieces of lumber have been sawn. For example, if the board being edged is a sideboard that was originally sawn from a log segment at the primary breakdown machine 124, then the computing device 116 may compare geometric characteristics based on image data from the primary breakdown scan zone 108 with geometric characteristics based on image data from the edger scan zone 112. The computing device 116 may then logically associate the edged board and edging strips with a sideboard (and thus a corresponding log) when matching geometric characteristics are detected. Similarly, if the board being edged is a board sawn at the gangsaw 128, then the computing device 116 may compare geometric characteristics based on image data from the gangsaw scan zone 110 with geometric characteristics based on image data from the edger scan zone 112. In yet another embodiment, the logical association may be based at least in part on an order in which the boards are processed at the edger 130.

Figure 15:
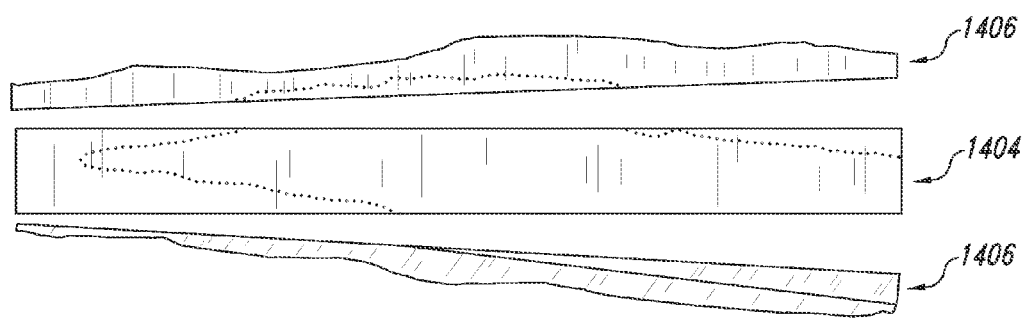
FIG. 15 is a representation of the board illustrated in FIG. 14.
Figure 16:
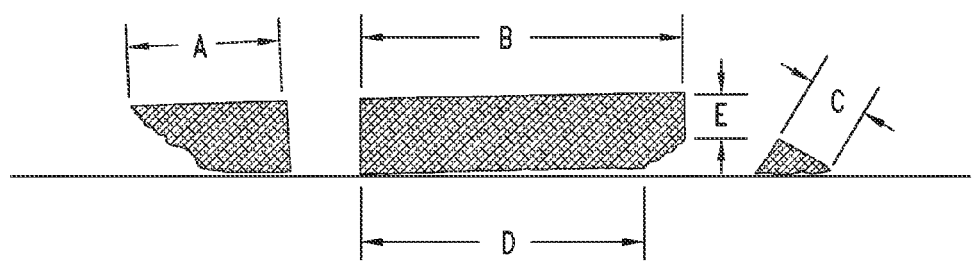
FIG. 16 is an enlarged, cross-sectional view of the board shown in FIG. 14.

The computing device 116 may then take advantage of the logical association in order to determine other geometric characteristics of the edged board and edging strips. For example, in FIG. 15, a lengthwise representation of the edged board 1404 and the edging strips 1406 is illustrated. The broken line represents the "hidden wane" on the underside of these pieces of lumber. In one embodiment, the computing device 116 may logically associate the edged board 1404 and the edging strips 1406 with at least one of a log or a cant from which the pieces of lumber were originally sawn, as described above. For example, the computing device 116 may determine geometric characteristics of the edged board 1404 and edging strips 1406 (such as the dimensions A, B and C of FIG. 16) and compare these geometric characteristics with geometric characteristics of sideboards sawn at the primary breakdown machine 124. Once the pieces of lumber have been logically associated with a particular log or cant, image data from an upstream scan zone may then be used by the computing device 116 to determine "hidden" geometric characteristics of the pieces of lumber. As illustrated in the cross-section of FIG. 16, dimensions such as D and E may be determined based on the geometric characteristics of the log or cant from which the edged board 1404 was sawn.

The computing device 116 may also provide feedback information to the sawmill personnel regarding the performance of the edger processing station. If the edged boards and wane-on pieces predicted by the edger computer optimizer do not match the realized pieces of lumber, then mechanical or programming adjustments may need to be made.

In yet another embodiment, the computing device 116 may also perform an independent optimization analysis based at least in part on image data from the edger scan zone 112, similar to the optimization analysis and comparison described above with respect to the primary breakdown scan zone 108.

The computing device 116 may also determine a value for the edged boards and edging strips emerging from the edger 130. As described above, the computing device 116 may also determine an optimal value corresponding to a log or cant from which these pieces of lumber were sawn. The realized value of the pieces of lumber may then be compared with the optimal value of the corresponding log or cant in order to determine whether or not the sawmill 100 is realizing the optimal value from each log or cant. Differences between the optimal and realized values may stem from defects in any of the processing stations in the sawmill 100 between receipt of a log at 118 and the outfeed of the edger 130.

Returning to FIG. 1, after processing at the edger 130, the boards may be transported to a trimmer 132, where they may be trimmed to their final length for distribution as finished lumber. The trimmer 130 may be associated with yet another optimization system and may include one or more saws for trimming the boards.

Figure 17:
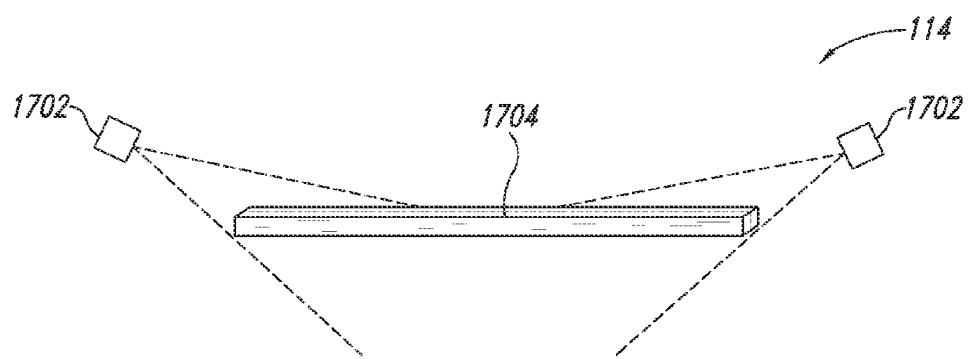
FIG. 17 is a side elevational view of a trimmer scan zone for use in the system of FIG. 1.
Figure 18:
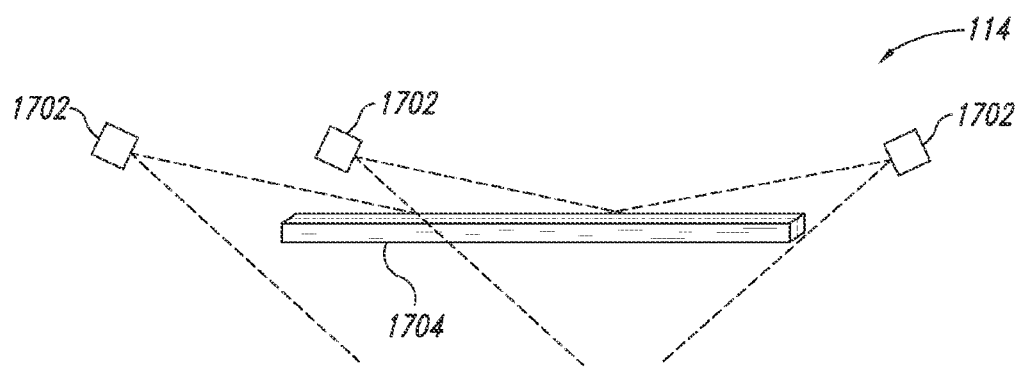
FIG. 18 is a side elevational view of an alternative trimmer scan zone for use in the system of FIG. 1.

As illustrated in FIGS. 17 and 18, the lumber tracking system 102 may include a trimmer scan zone 114 positioned to scan the pieces of lumber 1704 downstream from the trimmer 132. In one embodiment, the trimmer scan zone 114 may include two or more planar laser scanners 1702 oriented to scan the lumber 1704 transversely. The extra laser scanner 1702 depicted in FIG. 18 may be used for longer lumber, while the two scanner configuration of FIG. 17 may be used for shorter lumber. In other embodiments, different arrangements of laser scanners or different imaging systems may be used.

The laser scanners 1702 of the trimmer scan zone 114 may send image data to the computing device 116 representative of the pieces of lumber 1704. The computing device 116 may then determine at least one geometric characteristic for the lumber 1704. In one embodiment, the computing device 116 may determine length, width, thickness and wane characteristics of the lumber 1704. The computing device 116 may be further configured to logically associate the pieces of lumber

1704 with at least one of a log or a cant from which the pieces of lumber 1704 have been sawn, in any of the variety of ways discussed in detail above.

The computing device 116 may also provide feedback information to the sawmill personnel relating to the performance of the trimmer processing station. If the pieces of lumber predicted by the trimmer computer optimizer do not match the realized pieces of lumber 1704, then mechanical or programming adjustments may need to be made.

In yet another embodiment, the computing device 116 may also perform an independent optimization analysis based at least in part on the image data from the trimmer scan zone 114, similar to the optimization analysis and comparison described above with respect to the primary breakdown scan zone 108.

The computing device 116 may also determine a value for the pieces of lumber 1704 emerging from the trimmer 132. As described above, the computing device 116 may determine an optimal value corresponding to a log or cant from which these pieces of lumber 1704 were sawn, as well. The realized value of the pieces of lumber 1704 may then be compared with the optimal value of the corresponding log or cant in order to determine whether or not the sawmill 100 is actually realizing the optimal value from each log or cant. Differences between the optimal and realized values may stem from defects in any of the processing stations in the sawmill 100 between receipt of a log at 118 and the outfeed of the trimmer 132.

Figure 19:
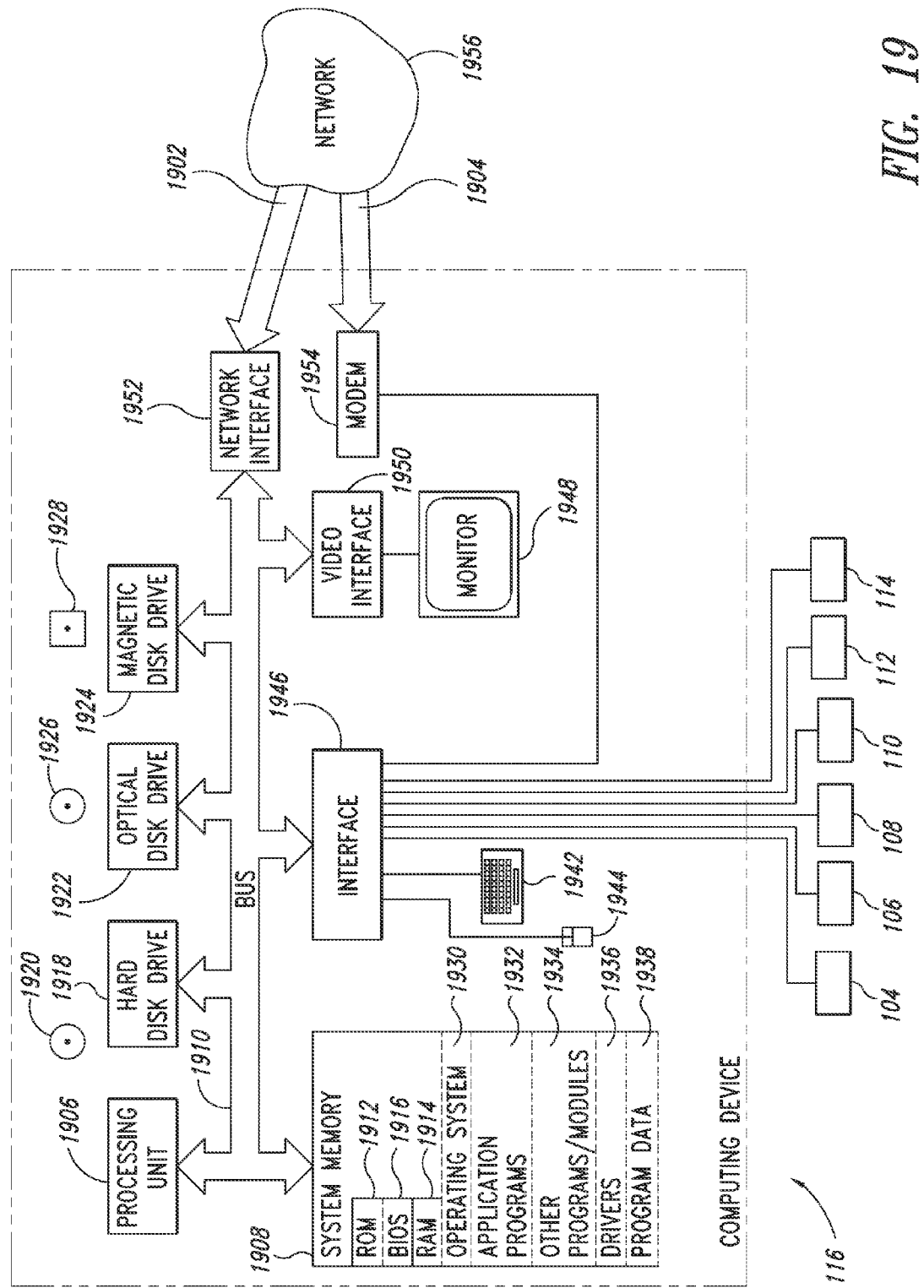
FIG. 19 is a schematic diagram of a computing device for use in the system of FIG. 1, according to one illustrated embodiment.

FIG. 19 is a schematic diagram of a computing device 116 for use with the lumber tracking system 102 of FIG. 1, according to one illustrated embodiment. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 19 shows the computing device 116 coupled by one or more communications channels/logical connections 1902, 1904 to a network 1956. However, in other embodiments, the computing device 116 need not be coupled to a network.

The computing device 116 may take the form of a conventional PC, which includes a processing unit 1906, a system memory 1908 and a system bus 1910 that couples various system components including the system memory 1908 to the processing unit 1906. The computing device 116 will at times be referred to in the singular herein, but this is not intended to limit the embodiments to a single computing system, since in certain embodiments, there will be more than one computer system involved. Non-limiting examples of commercially available computing devices include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 1906 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 19 are of conventional design. As a result, such blocks need not be described in further detail herein, as they will be understood by those skilled in the relevant art.

The system bus 1910 can employ any known bus structures or architectures, including a memory bus with memory controller, a peripheral bus, and a local bus. The system memory 1908 includes read-only memory ("ROM") 1912 and random access memory ("RAM") 1914. A basic input/output system ("BIOS") 1916, which can form part of the ROM 1912, contains basic routines that help transfer information between elements within the computing device 116, such as during start-up.

The computing device 116 also includes a hard disk drive 1918 for reading from and writing to a hard disk 1920, and an optical disk drive 1922 and a magnetic disk drive 1924 for reading from and writing to removable optical disks 1926 and magnetic disks 1928, respectively. The optical disk 1926 can be a CD or a DVD, while the magnetic disk 1928 can be a magnetic floppy disk or diskette. The hard disk drive 1918, optical disk drive 1922 and magnetic disk drive 1924 communicate with the processing unit 1906 via the system bus 1910. The hard disk drive 1918, optical disk drive 1922 and magnetic disk drive 1924 may include interfaces or controllers (not shown) coupled between such drives and the system bus 1910, as is known by those skilled in the relevant art. The drives 1918, 1922, 1924, and their associated computer-readable media 1920, 1926, 1928, provide nonvolatile storage of computer-readable instructions, data structures, program modules and other data for the computing device 116. Although the depicted computing device 116 employs hard disk 1920, optical disk 1926 and magnetic disk 1928, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 1908, such as an operating system 1930, one or more application programs 1932, other programs or modules 1934, drivers 1936 and program data 1938. While shown in FIG. 19 as being stored in the system memory 1908, the operating system 1930, application programs 1932, other programs/modules 1934, drivers 1936 and program data 1938 can be stored on the hard disk 1920 of the hard disk drive 1918, the optical disk 1926 of the optical disk drive 1922 and/or the magnetic disk 1928 of the magnetic disk drive 1924. A user can enter commands and information into the computing device 116 through input devices such as a touch screen or keyboard 1942 and/or a pointing device such as a mouse 1944. Other input devices can include a microphone, joystick, game pad, tablet, scanner, etc. These and other input devices are connected to the processing unit 1906 through an interface 1946 such as a universal serial bus ("USB") interface that couples to the system bus 1910, although other interfaces such as a parallel port, a game port or a wireless interface or a serial port may be used. A monitor 1948 or other display device is coupled to the system bus 1910 via a video interface 1950, such as a video adapter. Although not shown, the computing device 116 can include other output devices, such as speakers, printers, etc.

The computing device 116 may operate in a networked environment using one or both of the logical connections 1902, 1904 to communicate with one or more remote computers, servers and/or devices through the network 1956.

These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the computing device 116 may include a modem 1954 for establishing communications over the WAN 1904. Alternatively, another device, such as the network interface 1952 (communicatively linked to the system bus 1910), may be used for establishing communications over the WAN 1902. The modem 1954 is shown in FIG. 19 as communicatively linked between the interface 1946 and the WAN 1904. In a networked environment, program modules, application programs, or data, or portions thereof, can be stored in a server computing system (not shown). Those skilled in the relevant art will recognize that the network connections shown in FIG. 19 are only some examples of ways of establishing communications between computers, and other connections may be used, including wirelessly.

As illustrated in FIG. 19, the computing device 116 is further coupled to the scan zones 104, 106, 108, 110, 112, 114. In one embodiment, the scan zones are coupled to the system bus 1910 through the interface 1946 and are thereby communicatively coupled to the computing device 116. The computing device 116 may further include optimizer application programs for receiving data from other scanners (not illustrated), processing that data, and determining optimal sawing processes. In such an embodiment, the computing device 116 may further receive up-to-date market information for lumber via the network 1956. In other embodiments, the computing device 116 may be a separate, auditing computer that may or may not communicate with computer optimizers.

Figure 20:
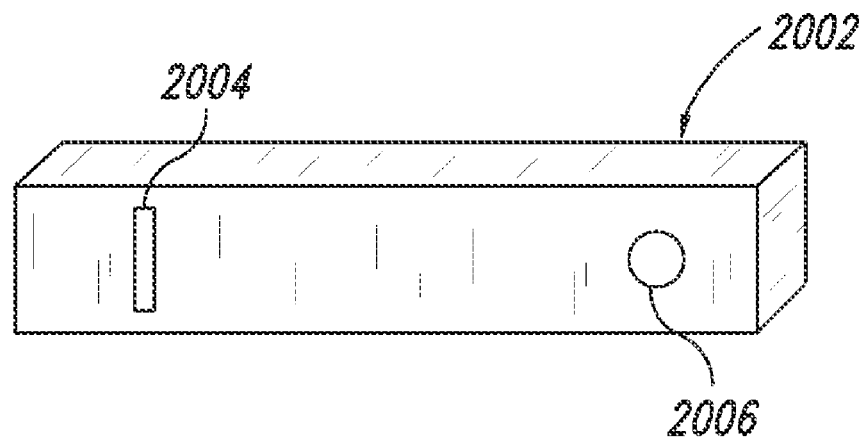
FIG. 20 is a schematic view of a laser scanner including one light source and an image generator, which may be used in the system of FIG. 1.
Figure 21:
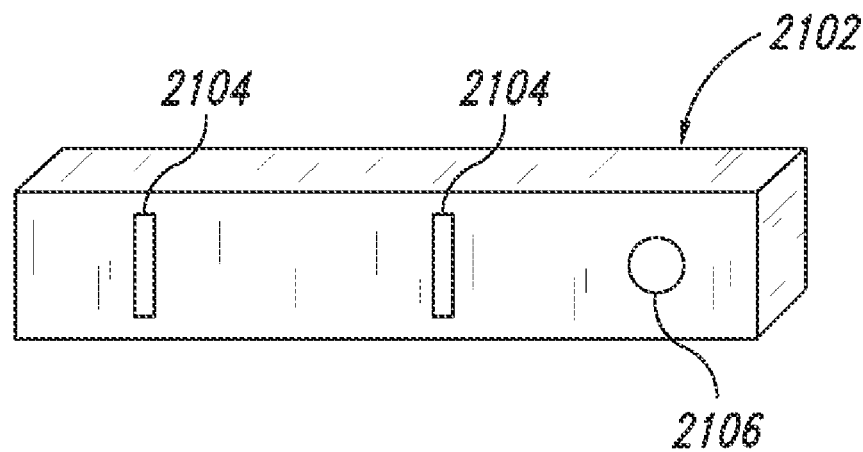
FIG. 21 is a schematic view of a laser scanner including two light sources and an image generator, which may be used in the system of FIG. 1.

FIGS. 20 and 21 are schematic views of example laser scanners 2002, 2102 that may be used in the lumber tracking system 102, at any of the scan zones. These laser scanners 2002, 2102 comprise planar laser scanners having one or two light sources 2004, 2104 and a single image generator 2006, 2106. They may be configured as described in detail above and may include a wired or wireless interface for transmitting data from the image generator 2006, 2106 to the computing device 116.

Discussion of a Method of Tracking Lumber According to One Embodiment

Figure 22:
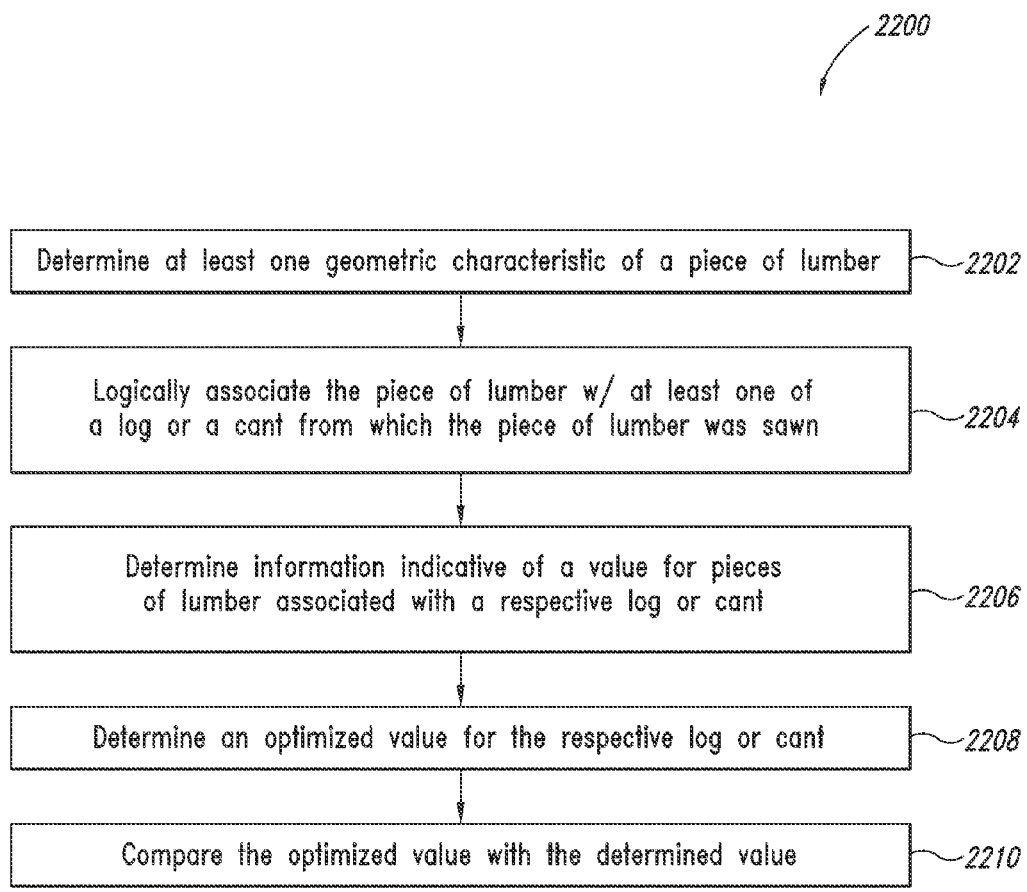
FIG. 22 is a flow diagram illustrating a method of tracking lumber in a sawmill, according to one illustrated embodiment.

FIG. 22 illustrates a flow diagram for a method 2200 of tracking lumber through a sawmill 100, according to one embodiment. The flow diagram will be discussed in terms of the lumber tracking system 102 of FIG. 1. However, the acts of the method 2200 may be carried out using other systems and devices as well.

The method begins at 2202, when at least one geometric characteristic of a piece of lumber is determined. This act of determining the at least one geometric characteristic may be performed using any of the plurality of scan zones illustrated in FIG. 1 communicatively coupled with the computing device 116. The piece of lumber may be any piece of wood at any processing operation in the sawmill 100.

In one embodiment, the piece of lumber is imaged near at least one of the scan zones. The imaging may be performed by any imaging system and, in one embodiment, may be performed using the laser scanners described herein. The image data from the scan zones may then be forwarded to the computing device 116, where at least one geometric characteristic may be determined for the piece of lumber based at least in part on the image data. As discussed above, the geometric characteristics may also be determined based on image data from at least two scan zones (e.g., geometric characteristics of an edged board may be determined based on image data from the edger scan zone 112 and from the primary breakdown scan zone 108). The determined geometric characteristics may include widths, wane characteristics, thicknesses, lengths, locations, grain pattern, etc. of the pieces of lumber.

At 2204, the piece of lumber is logically associated with at least one of a log or a cant from which the piece of lumber was sawn, by any of a variety of methodologies. For example, the geometric characteristics of the logs and cants may be compared with the geometric characteristics of the pieces of lumber to find a match. In other embodiments, a radio frequency identification tag or a color may be associated with a particular log or cant and subsequently detected at a scan zone. In yet another embodiment, the order in which a piece of lumber arrives at a scan zone may be used by the computing device 116 to logically associate the piece of lumber with a corresponding log or cant from which it was sawn.

The computing device 116 may implement this logical association in a variety of ways. For example, in one embodiment, a pointer may be created to point from data representing the piece of lumber to data representing a respective log or cant. In another embodiment, data representing the piece of lumber and data representing a respective log or cant may be stored in a table or database entry. In still another embodiment, each log or cant may have a number of data entries associated therewith, including entries relating to the pieces of lumber sawn therefrom.

At 2206, information indicative of a value for the pieces of lumber associated with a respective log or cant may be determined. In one embodiment, the computing device 116 may determine which pieces of lumber are associated with a particular log or cant. Having identified those pieces of lumber, the computing device 116 may use market information to determine an approximate value for those pieces of lumber. The computing device 116 may further take into account processing costs for those pieces of lumber, including the costs of processing the pieces of lumber throughout the sawmill 100 as well as subsequent processing costs to produce finished lumber. The computing device 116 may also compare the costs of the pieces of lumber relative to other pieces of lumber that may have been obtained from a particular log or cant. Thus, the computing device 116 may be capable of determining a value for the lumber obtained from a particular log or cant processed at the sawmill 100.

At 2208, an optimal value for the respective log or cant may also be determined. In one embodiment, an optimal mix of lumber having a corresponding optimal value may be determined by the computing device 116 based on the geometric characteristics of the respective log or cant (for example, based on image data from a scan zone early in the lumber tracking process, such as the bucking scan zone 104, log segment scan zone 106 or primary breakdown scan zone 108).

In another embodiment, the optimal mix of lumber obtainable from a log or cant may be determined by the computing device 116 based on image data from a plurality of the scan zones. In such an embodiment, the optimal mix of lumber may take into account not just the originally scanned geometry of a log or cant but later determined information regarding the pieces of lumber sawn from the log or cant as well. For example, a piece of lumber may reveal knotty or otherwise unsuitable wood that may impact the optimal mix of lumber obtainable from a particular log or cant.

In yet another embodiment, the optimal value may be determined by separate hardware (e.g., a computer optimizer).

At 2210, the optimal value may be compared against the determined value. This comparison may yield valuable information concerning whether or not the sawmill 100 is realizing an optimal value from each log or cant. In addition, databases of such values may be stored, so that the sawmill 100 may determine, for example, that it is achieving optimal values only for logs or cants of particular dimensions. This information may then help to diagnose problems in the processing stations of the sawmill 100 or may allow the sawmill 100 to focus on those logs or cants from which it can obtain more optimal results. Indeed, by monitoring the lumber derived from only a small subset of the logs or cants processed at the sawmill 100, this sample data may be used to monitor the performance of the sawmill 100 as a whole.

Description of another Example System for Tracking Lumber in a Sawmill

Figure 23:
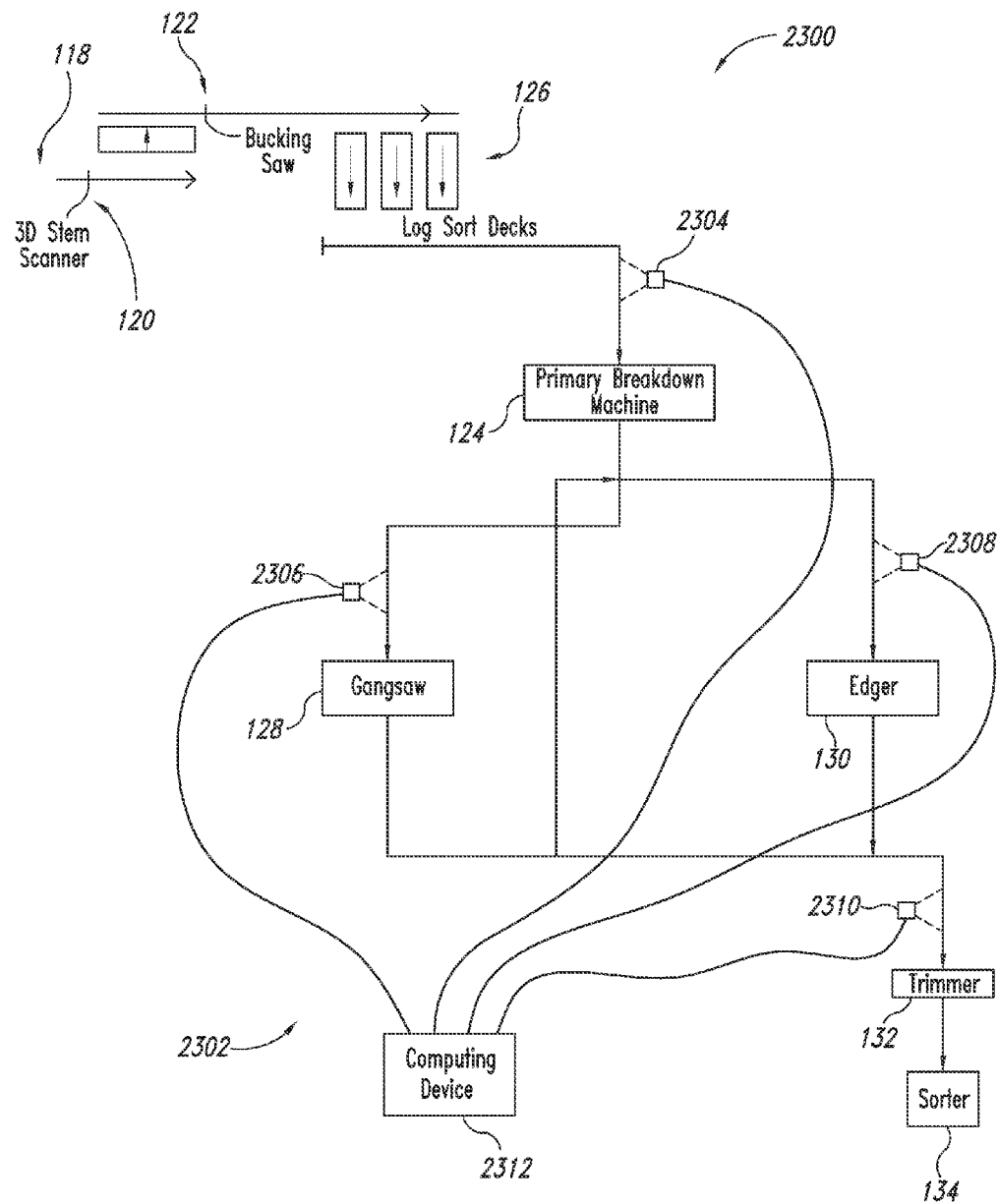
FIG. 23 is a schematic view of another example sawmill incorporating a system for tracking lumber, according to one illustrated embodiment.

FIG. 23 is a schematic view of another example sawmill 2300 incorporating a system 2302 for tracking lumber, according to one illustrated embodiment. The example sawmill 2300 has a similar layout to the sawmill 100 discussed at length above, with similar numbers used to designate similar components. It may be understood that much of the description above may apply equally to the sawmill 2300 discussed herein.

As illustrated, the system 2302 for tracking lumber includes a plurality of scan zones, including a primary breakdown scan zone 2304, a gangsaw scan zone 2306, an edger scan zone 2308 and a trimmer scan zone 2310. Each of these scan zones may be coupled to a central computing device 2312, which forms part of the lumber tracking system 2302. Although the lumber tracking system 2302 includes four scan zones, other systems for tracking lumber may include more or fewer scan zones, and the scan zones may be in different locations and differently configured. For example, in one embodiment, only the gangsaw scan zone 2306 and the edger scan zone 2308 may be used in the system for tracking lumber. In addition, in one embodiment, each of the scan zones may include computer optimizers configured to control respective sawing operations near each scan zone using respective programmable logic controllers (PLCs). However, in other embodiments, the scan zones may be independent of any computer optimizing hardware.

The computing device 2312 may be communicatively coupled to structures of the scan zones and may receive image data and/or other sensor data therefrom in order to determine at least one geometric characteristic for each piece of lumber. The computing device 2312 may then logically associate pieces of lumber at different scan zones with each other based at least in part on these geometric characteristics. Based on the data received from the structures of the different scan zones, as described in greater detail above, a variety of acts may be performed by the computing device 2312 in order to perform this logical association.

In one embodiment, log segments 204 may be transported to the primary breakdown machine 124, as described above. The primary breakdown machine 124 processes the log segments 204 to produce cants 428 and may include chip heads for removing slab wood as well as one or more saws (e.g., round saws or band saws) for sawing sideboards 406 from the cants 428.

In one embodiment, the primary breakdown scan zone 2304 may be positioned near an infeed of the primary breakdown machine 124 and may comprise a primary breakdown optimization system configured to scan each log segment 204. After each log segment 204 is scanned, a primary breakdown computer optimizer (not shown) may analyze the geometry of each log segment 204 to determine an optimal mix of lumber that might be obtained. Based on that determination, the primary breakdown computer optimizer may control the primary breakdown machine 124 during sawing of the log segment 204. For example, the rotation and movement of each log segment 204 as well as the relative position of the chip heads and saws with respect to each log segment 204 may be controlled via a PLC. In other embodiments, the structures of the primary breakdown scan zone 2304 may remain separate from a primary breakdown optimization system.

In one embodiment, the primary breakdown scan zone 2304 may include one or more laser scanners. In other embodiments, any of a variety of laser scanning configurations or other imaging systems may be implemented in the primary breakdown scan zone 2304, as described at length above.

Data indicative of the log segment 204 may be generated by one or more laser scanners in the primary breakdown scan zone 2304 and may then be sent to the primary breakdown computer optimizer. The computing device 2312 may then receive geometric information indicative of the log segment 204 from the primary breakdown computer optimizer. This geometric information may be received by the computing device 2312 in any of a number of ways. In one embodiment, image data associated with a current display of the primary breakdown computer optimizer may be received at the computing device 2312, and the computing device 2312 may then extract the geometric information indicative of the log segment from the received image data. This image data may comprise, for example, a screenshot of the current display. The received geometric information may then be used to determine at least one geometric characteristic of the log segment 204. Such geometric characteristics may comprise location, shape, wane, face, size or grain pattern information. The geometric characteristics may further include a number of ratios or other geometric relationships, as described at length above.

In one embodiment, the cants 428 from the primary breakdown machine 124 may be transported to the gangsaw 128, and sideboards 406 generated at the primary breakdown machine 124 may be transported to the edger 130. In one embodiment, the gangsaw scan zone 2306 may be positioned near an infeed of the gangsaw 128 and may comprise a gangsaw optimization system configured to scan each cant 428. After scanning each cant 428, a gangsaw computer optimizer (not shown) may analyze the geometry of each cant 428 to determine an optimal mix of lumber that might be obtained. Based on that determination, the gangsaw computer optimizer may control the gangsaw during sawing of the cant 428. For example, the movement of each cant 428 as well as the relative position of chip heads and gangsaws with respect to each cant 428 may be controlled via a PLC. In other embodiments, the gangsaw scan zone 2306 may remain separate from a gangsaw optimization system.

In one embodiment, the gangsaw scan zone 2306 may include one or more laser scanners. In other embodiments, any of a variety of laser scanning configurations or other imaging systems may be implemented in the gangsaw scan zone 2306, as described at length above.

Data indicative of the cant 428 may be generated by one or more laser scanners in the gangsaw scan zone 2306 and then sent to a gangsaw computer optimizer. The computing device 2312 may then receive geometric information indicative of the cant 428 from the gangsaw computer optimizer. This geometric information may be received by the computing device 2312 in any of a number of ways. In one embodiment, image data associated with a current display of the gangsaw computer optimizer may be received at the computing device 2312, and the computing device 2312 may then extract the geometric information indicative of the cant 428 from the received image data. The geometric information received at the computing device 2312 may then be used to determine at least one geometric characteristic of the cant 428.

In one embodiment, the computing device 2312 may logically associate the cant 428 with the log segment 204 from which the cant 428 has been sawn. In one embodiment, this logical association may be performed by comparing geometric characteristics of the cant 428 with geometric characteristics of the log segments 204, as scanned at the primary breakdown scan zone 2304. In another embodiment, log segments 204 may be scanned at the primary breakdown scan zone 2304 and cants 428 at the gangsaw scan zone 2306 in substantially the same order, and this ordering may be used to associate cants 428 with respective log segments 204.

In one embodiment, the sideboards 406 produced at the primary breakdown machine 124, and boards 708 produced at the gangsaw 128 may be further processed by an edger 130. The edger 130 may include one or more movable saws for sawing along the length of each board.

The lumber tracking system 2302 may include an edger scan zone 2308 positioned near an infeed of the edger 130 having one or more laser scanners. In one embodiment, the edger scan zone 2308 may comprise an edger optimization system configured to scan the sideboards 406 and boards 708. After scanning each board, an edger computer optimizer (not shown) may analyze their geometry to determine an optimal edging algorithm. Based on that determination, the edger computer optimizer may control the edger 130 during sawing of the boards. For example, the movement of each board as well as the relative position of edging saws with respect to each board may be controlled via a PLC. In other embodiments, the edger scan zone 2308 may remain separate from an edger optimization system.

In one embodiment, the edger scan zone 2308 may include one or more laser scanners. In other embodiments, any of a variety of laser scanning configurations or other imaging systems may be implemented in the edger scan zone 2308, as described at length above.

Data indicative of the boards may be generated by one or more laser scanners in the edger scan zone 2308 and may then be sent to the edger computer optimizer. The computing device 2312 may then receive geometric information indicative of the boards from the edger computer optimizer. This geometric information may be received by the computing device 2312 in any of a number of ways. In one embodiment, image data associated with a current display of the edger computer optimizer may be received at the computing device 2312, and the computing device 2312 may then extract the geometric information indicative of a board from the image data. The received geometric information may then be used to determine at least one geometric characteristic of a board.

In one embodiment, the computing device 2312 may logically associate a sideboard 406 with a corresponding cant 428, both of which were sawn from the same log segment 204. In one embodiment, this logical association may be performed based at least in part upon geometric characteristics of the cant 428 and geometric characteristics of the sideboard 406. For example, the geometric characteristics of the cant 428, as scanned at the gangsaw scan zone 2306, may be compared with the geometric characteristics of the sideboard 406, as scanned at the edger scan zone 2308. The cant 428 may then be logically associated with the sideboard 406 based upon the comparison. For example, a face of the sideboard 406 may have geometric characteristics matching those of a corresponding face of the cant 428 from which the sideboard 406 was sawn at the primary breakdown machine 124. In one embodiment, just the gangsaw scan zone 2306 and the edger scan zone 2308 may be used, and the original log segment may be "recreated" using the geometric characteristics of the cant 428 and the sideboard 406.

In another embodiment, the computing device 2312 may logically associate the sideboard 406 and the cant 428 with a corresponding log segment 204. In one embodiment, this logical association may be performed based at least in part upon geometric characteristics of the cant 428, geometric characteristics of the sideboard 406, and geometric characteristics of the log segment 204. For example, the geometric characteristics of the cant 428, as scanned at the gangsaw scan zone 2306, and the geometric characteristics of the sideboard 406, as scanned at the edger scan zone 2308, may be compared with the geometric characteristics of the log segment 204, as scanned at the primary breakdown scan zone 2304. These pieces of lumber may then be logically associated based at least in part on the comparison.

The computing device 2312 may also receive information from the primary breakdown computer optimizer indicative of the pieces of lumber predicted from a particular log segment 204. In one embodiment, after logically associating this log segment 204 with corresponding cant(s) 428 and/or sideboard(s) 406, the pieces of lumber predicted for the log segment 204 may be compared with information associated with the cant(s) 428 and/or sideboard(s) 406. The computing device 2312 may thereby determine whether or not the primary breakdown computer optimizer is correctly predicting the lumber that may be extracted from a given log segment 204.

In one embodiment, a number of boards emerging from the edger 130 may be further processed by a trimmer 132. The trimmer 132 may include one or more movable saws for trimming the boards.

The lumber tracking system 2302 may include a trimmer scan zone 2310 positioned near an infeed of the trimmer 132 having one or more laser scanners. In one embodiment, the trimmer scan zone 2310 may comprise a trimmer optimization system configured to scan each board sent to the trimmer 132. After scanning each board, a trimmer computer optimizer (not shown) may analyze the geometry of each board to determine an optimal trimming algorithm. Based on that determination, the trimmer computer optimizer may control the trimmer 132 during sawing of the boards. For example, the movement of each board as well as the relative position of trimming saws with respect to each board may be controlled via a PLC. In other embodiments, the trimmer scan zone 2310 may be kept separate from a trimmer optimization scanning system.

The trimmer scan zone 2310 may include one or more laser scanners. In other embodiments, any of a variety of laser scanning configurations or other imaging systems may be implemented in the trimmer scan zone 2310, as described at length above.

Data indicative of the geometric characteristics of the boards may be generated by one or more laser scanners in the trimmer scan zone 2310 and may then be sent to a trimmer computer optimizer. The computing device 2312 may then receive geometric information indicative of the geometric characteristics of the boards from the trimmer computer optimizer. This geometric information may be received by the computing device 2312 in any of a number of ways. In one embodiment, image data associated with a current display of the trimmer computer optimizer may be received at the computing device 2312, and the computing device 2312 may then extract the geometric information indicative of the geometric characteristics of the boards from the image data. The geometric information received at the computing device 2312 may then be used to determine at least one geometric characteristic of the boards.

In one embodiment, the computing device 2312 may logically associate the boards at the trimmer 132 with a corresponding sideboard 406, cant 428, and/or log segment 204. In one embodiment, this logical association may be performed based at least in part upon geometric characteristics of the boards and geometric characteristics of a sideboard 406, cant 428 and/or log segment 204. In one embodiment, the geometric characteristics of the cant 428, as scanned at the gangsaw scan zone 2306, the geometric characteristics of the sideboard 406, as scanned at the edger scan zone 2308, and/or the geometric characteristics of the log segment 204, as scanned at the primary breakdown scan zone 2304, may be compared with the geometric characteristics of the boards, as scanned at the trimmer scan zone 2310. The cant 428, sideboard 406 and/or log segment 204 may then be logically associated with the boards based upon the comparison.

In other embodiments, as described in greater detail above, the scan zones 2304, 2306, 2308, 2310 need not include computer optimizers, and the scanning devices in such scan zones may be coupled directly to the computing device 2312. In some embodiments, the computing device 2312 alone may provide all of the optimization capabilities provided by the plurality of computer optimizers described above.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A system for tracking lumber in a sawmill comprising:
a first laser scanner positioned to scan sideboards near an infeed of an edger;
a second laser scanner positioned to scan cants near an infeed of a gangsaw;
at least one computing device coupled to the first laser scanner and the second laser scanner, the at least one computing device configured to determine at least one geometric characteristic of a sideboard, determine at least one geometric characteristic of a cant, and logically associate the sideboard with the cant from which the sideboard was sawn based at least in part on the at least one geometric characteristic of the sideboard and the at least one geometric characteristic of the cant;
wherein the at least one computing device includes:
an edger computer optimizer communicatively coupled to the first laser scanner and configured to control the edger during sawing of the sideboard based at least in part on data received from the first laser scanner;
a mill audit computing device communicatively coupled to the edger computer optimizer and configured to receive geometric information indicative of the sideboard from the edger computer optimizer, the mill audit computing device further configured to determine the at least one geometric characteristic of the sideboard based at least in part on the received geometric information;
wherein the mill audit computing devices is further configured to receive image data associated with a current display of the edger computer optimizer and extract the geometric information indicative of the sideboard from the received image data; and
wherein the at least one computing device further includes a gangsaw computer optimizer communicatively coupled to the second laser scanner and configured to control the gangsaw during sawing of the cant based at least in part on data received from the second laser scanner, and wherein the mill audit computing device is further communicatively coupled to the gangsaw computer optimizer and configured to receive geometric information indicative of the cant from the gangsaw computer optimizer, and is further configured to determine the at least one geometric characteristic of the cant based at least in part on the received geometric information.

2. The system of claim 1, further comprising:
a third laser scanner positioned to scan logs near an infeed of a primary breakdown machine;
wherein the at least one computing device is coupled to the third laser scanner and is further configured to determine at least one geometric characteristic of a log, to compare the at least one geometric characteristic of the log with the at least one geometric characteristic of the sideboard and the at least one geometric characteristic of the cant, and to logically associate the sideboard and the cant from which the sideboard was sawn with the log based at least in part on the comparison.

3. The system of claim 2, wherein the at least one computing device further includes a primary breakdown computer optimizer communicatively coupled to the third laser scanner and configured to control the primary breakdown machine during sawing of the log based at least in part on data received from the third laser scanner, and wherein the mill audit computing device is further communicatively coupled to the primary breakdown computer optimizer and configured to receive geometric information indicative of the log from the primary breakdown computer optimizer, and is further configured to determine the at least one geometric characteristic of the log based at least in part on the received geometric information.

\* \* \* \* \*